(12) United States Patent
Adiletta et al.

(10) Patent No.: US 10,349,152 B2
(45) Date of Patent: Jul. 9, 2019

(54) ROBOTICALLY SERVICEABLE COMPUTING RACK AND SLEDS

(71) Applicant: INTEL CORPORATION, Santa Clara, CA (US)

(72) Inventors: Matthew J. Adiletta, Bolton, MA (US); Aaron Gorius, Upton, MA (US); Myles Wilde, Charlestown, MA (US); Michael T. Crocker, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/396,187

(22) Filed: Dec. 30, 2016

(65) Prior Publication Data

US 2018/0027686 A1 Jan. 25, 2018

Related U.S. Application Data

(60) Provisional application No. 62/427,268, filed on Nov. 29, 2016, provisional application No. 62/376,859, (Continued)

(51) Int. Cl.
*G06F 1/16* (2006.01)
*H04Q 11/00* (2006.01)
(Continued)

(52) U.S. Cl.
CPC ...... *H04Q 11/0005* (2013.01); *B25J 15/0014* (2013.01); *B65G 1/0492* (2013.01); *G02B 6/3882* (2013.01); *G02B 6/3893* (2013.01); *G02B 6/3897* (2013.01); *G02B 6/4292* (2013.01); *G02B 6/4452* (2013.01); *G05D 23/1921* (2013.01); *G05D 23/2039* (2013.01);

*G06F 1/183* (2013.01); *G06F 3/061* (2013.01); *G06F 3/064* (2013.01); *G06F 3/067* (2013.01); *G06F 3/0611* (2013.01); *G06F 3/0613* (2013.01); *G06F 3/0616* (2013.01); *G06F 3/0619* (2013.01); *G06F 3/0625* (2013.01); *G06F 3/0631* (2013.01); *G06F 3/0638* (2013.01); *G06F 3/0647* (2013.01); *G06F 3/0653* (2013.01); *G06F 3/0655* (2013.01);
(Continued)

(58) Field of Classification Search
CPC .. H05K 7/1489; H05K 7/1488; B25J 15/0014
USPC ........................................................ 361/756
See application file for complete search history.

(56) References Cited

U.S. PATENT DOCUMENTS 5,277,615 A * 1/1994 Hastings ................. G06F 1/181
361/679.32
8,477,491 B1 7/2013 Ross et al.
(Continued)

OTHER PUBLICATIONS

International Search Report received for PCT Patent Application No. PCT/US2017/038538, dated Sep. 27, 2017, 4 pages.

*Primary Examiner* — Mandeep S Buttar
(74) *Attorney, Agent, or Firm* — Barnes & Thornburg LLP

(57) ABSTRACT

Examples may include racks for a data center and sleds for the racks, the sleds arranged to house physical resources for the data center. The sleds and racks can be arranged to be autonomously manipulated, such as, by a robot. The sleds and racks can include features to facilitate automated installation, removal, maintenance, and manipulation by a robot.

24 Claims, 29 Drawing Sheets

Related U.S. Application Data filed on Aug. 18, 2016, provisional application No. 62/365,969, filed on Jul. 22, 2016.

(51) Int. Cl.
| | |
|---|---|
| H03M 7/40 | (2006.01) |
| H03M 7/30 | (2006.01) |
| G06F 16/901 | (2019.01) |
| G06F 3/06 | (2006.01) |
| G11C 7/10 | (2006.01) |
| H05K 7/14 | (2006.01) |
| G06F 1/18 | (2006.01) |
| G06F 13/40 | (2006.01) |
| H05K 5/02 | (2006.01) |
| G08C 17/02 | (2006.01) |
| H04L 12/24 | (2006.01) |
| H04L 29/08 | (2006.01) |
| H04L 12/26 | (2006.01) |
| H04L 12/851 | (2013.01) |
| G06F 9/50 | (2006.01) |
| H04L 12/911 | (2013.01) |
| G06F 12/109 | (2016.01) |
| H04L 29/06 | (2006.01) |
| G11C 14/00 | (2006.01) |
| G11C 5/02 | (2006.01) |
| G11C 11/56 | (2006.01) |
| G02B 6/44 | (2006.01) |
| G06F 8/65 | (2018.01) |
| G06F 12/14 | (2006.01) |
| G06F 13/16 | (2006.01) |
| H04B 10/25 | (2013.01) |
| G06F 9/4401 | (2018.01) |
| G02B 6/38 | (2006.01) |
| G02B 6/42 | (2006.01) |
| B25J 15/00 | (2006.01) |
| B65G 1/04 | (2006.01) |
| H05K 7/20 | (2006.01) |
| H04L 12/931 | (2013.01) |
| H04L 12/939 | (2013.01) |
| H04W 4/02 | (2018.01) |
| H04L 12/751 | (2013.01) |
| G06F 13/42 | (2006.01) |
| H05K 1/18 | (2006.01) |
| G05D 23/19 | (2006.01) |
| G05D 23/20 | (2006.01) |
| H04L 12/927 | (2013.01) |
| H05K 1/02 | (2006.01) |
| H04L 12/781 | (2013.01) |
| H04Q 1/04 | (2006.01) |
| G06F 12/0893 | (2016.01) |
| H05K 13/04 | (2006.01) |
| G11C 5/06 | (2006.01) |
| G06F 11/14 | (2006.01) |
| G06F 11/34 | (2006.01) |
| G06F 12/0862 | (2016.01) |
| G06F 15/80 | (2006.01) |
| H04L 12/919 | (2013.01) |
| G06F 12/10 | (2016.01) |
| G06Q 10/06 | (2012.01) |
| G07C 5/00 | (2006.01) |
| H04L 12/28 | (2006.01) |
| H04L 29/12 | (2006.01) |
| H04L 9/06 | (2006.01) |
| H04L 9/14 | (2006.01) |
| H04L 9/32 | (2006.01) |
| H04L 12/933 | (2013.01) |
| H04L 12/947 | (2013.01) |
| H04L 12/811 | (2013.01) |
| H04W 4/80 | (2018.01) |
| G06Q 10/08 | (2012.01) |
| G06Q 10/00 | (2012.01) |
| G06Q 50/04 | (2012.01) |

(52) U.S. Cl.
CPC .......... *G06F 3/0658* (2013.01); *G06F 3/0659* (2013.01); *G06F 3/0664* (2013.01); *G06F 3/0665* (2013.01); *G06F 3/0673* (2013.01); *G06F 3/0679* (2013.01); *G06F 3/0683* (2013.01); *G06F 3/0688* (2013.01); *G06F 3/0689* (2013.01); *G06F 8/65* (2013.01); *G06F 9/4401* (2013.01); *G06F 9/505* (2013.01); *G06F 9/5016* (2013.01); *G06F 9/5044* (2013.01); *G06F 9/5072* (2013.01); *G06F 9/5077* (2013.01); *G06F 11/141* (2013.01); *G06F 11/3414* (2013.01); *G06F 12/0862* (2013.01); *G06F 12/0893* (2013.01); *G06F 12/10* (2013.01); *G06F 12/109* (2013.01); *G06F 12/1408* (2013.01); *G06F 13/161* (2013.01); *G06F 13/1668* (2013.01); *G06F 13/1694* (2013.01); *G06F 13/409* (2013.01); *G06F 13/4022* (2013.01); *G06F 13/4068* (2013.01); *G06F 13/42* (2013.01); *G06F 13/4282* (2013.01); *G06F 15/8061* (2013.01); *G06F 16/9014* (2019.01); *G06Q 10/06* (2013.01); *G06Q 10/06314* (2013.01); *G07C 5/008* (2013.01); *G08C 17/02* (2013.01); *G11C 5/02* (2013.01); *G11C 5/06* (2013.01); *G11C 7/1072* (2013.01); *G11C 11/56* (2013.01); *G11C 14/0009* (2013.01); *H03M 7/30* (2013.01); *H03M 7/3084* (2013.01); *H03M 7/3086* (2013.01); *H03M 7/40* (2013.01); *H03M 7/4031* (2013.01); *H03M 7/4056* (2013.01); *H03M 7/4081* (2013.01); *H03M 7/6005* (2013.01); *H03M 7/6023* (2013.01); *H04B 10/2504* (2013.01); *H04L 9/0643* (2013.01); *H04L 9/14* (2013.01); *H04L 9/3247* (2013.01); *H04L 9/3263* (2013.01); *H04L 12/2809* (2013.01); *H04L 29/12009* (2013.01); *H04L 41/024* (2013.01); *H04L 41/046* (2013.01); *H04L 41/082* (2013.01); *H04L 41/0813* (2013.01); *H04L 41/0896* (2013.01); *H04L 41/145* (2013.01); *H04L 41/147* (2013.01); *H04L 43/08* (2013.01); *H04L 43/0817* (2013.01); *H04L 43/0876* (2013.01); *H04L 43/0894* (2013.01); *H04L 43/16* (2013.01); *H04L 45/02* (2013.01); *H04L 45/52* (2013.01); *H04L 47/24* (2013.01); *H04L 47/38* (2013.01); *H04L 47/765* (2013.01); *H04L 47/782* (2013.01); *H04L 47/805* (2013.01); *H04L 47/82* (2013.01); *H04L 47/823* (2013.01); *H04L 49/15* (2013.01); *H04L 49/25* (2013.01); *H04L 49/357* (2013.01); *H04L 49/45* (2013.01); *H04L 49/555* (2013.01); *H04L 67/02* (2013.01); *H04L 67/10* (2013.01); *H04L 67/1004* (2013.01); *H04L 67/1008* (2013.01); *H04L 67/1012* (2013.01); *H04L 67/1014* (2013.01); *H04L 67/1029* (2013.01); *H04L 67/1034* (2013.01); *H04L 67/1097* (2013.01); *H04L 67/12* (2013.01); *H04L 67/16* (2013.01); *H04L 67/306* (2013.01); *H04L 67/34*

(2013.01); *H04L 69/04* (2013.01); *H04L 69/329* (2013.01); *H04Q 1/04* (2013.01); *H04Q 11/00* (2013.01); *H04Q 11/0003* (2013.01); *H04Q 11/0062* (2013.01); *H04Q 11/0071* (2013.01); *H04W 4/023* (2013.01); *H05K 1/0203* (2013.01); *H05K 1/181* (2013.01); *H05K 5/0204* (2013.01); *H05K 7/1418* (2013.01); *H05K 7/1421* (2013.01); *H05K 7/1422* (2013.01); *H05K 7/1447* (2013.01); *H05K 7/1461* (2013.01); *H05K 7/1487* (2013.01); *H05K 7/1489* (2013.01); *H05K 7/1491* (2013.01); *H05K 7/1492* (2013.01); *H05K 7/1498* (2013.01); *H05K 7/2039* (2013.01); *H05K 7/20709* (2013.01); *H05K 7/20727* (2013.01); *H05K 7/20736* (2013.01); *H05K 7/20745* (2013.01); *H05K 7/20836* (2013.01); *H05K 13/0486* (2013.01); *G06F 2209/5019* (2013.01); *G06F 2209/5022* (2013.01); *G06F 2212/1008* (2013.01); *G06F 2212/1024* (2013.01); *G06F 2212/1041* (2013.01); *G06F 2212/1044* (2013.01); *G06F 2212/152* (2013.01); *G06F 2212/202* (2013.01); *G06F 2212/401* (2013.01); *G06F 2212/402* (2013.01); *G06F 2212/7207* (2013.01); *G06Q 10/087* (2013.01); *G06Q 10/20* (2013.01); *G06Q 50/04* (2013.01); *G08C 2200/00* (2013.01); *H04B 10/25* (2013.01); *H04L 41/12* (2013.01); *H04L 41/5019* (2013.01); *H04L 43/065* (2013.01); *H04Q 2011/0037* (2013.01); *H04Q 2011/0041* (2013.01); *H04Q 2011/0052* (2013.01); *H04Q 2011/0073* (2013.01); *H04Q 2011/0079* (2013.01); *H04Q 2011/0086* (2013.01); *H04Q 2213/13523* (2013.01); *H04Q 2213/13527* (2013.01); *H04W 4/80* (2018.02); *H05K 7/1485* (2013.01); *H05K 2201/066* (2013.01); *H05K 2201/10121* (2013.01); *H05K 2201/10159* (2013.01); *H05K 2201/10189* (2013.01); *Y02D 10/14* (2018.01); *Y02D 10/151* (2018.01); *Y02P 90/30* (2015.11); *Y10S 901/01* (2013.01)

(56) References Cited

U.S. PATENT DOCUMENTS

| | | | |
|---|---|---|---|
| 9,929,933 B1* | 3/2018 | Viljoen | H04B 10/27 |
| 2008/0186667 A1* | 8/2008 | Verdiell | H05K 7/1492 361/679.4 |
| 2009/0086441 A1 | 4/2009 | Randall et al. | |
| 2009/0097213 A1* | 4/2009 | Bicknell | G02B 6/43 361/752 |
| 2011/0189934 A1 | 8/2011 | Merrow | |
| 2012/0152586 A1 | 6/2012 | Frutschy et al. | |
| 2015/0289405 A1 | 10/2015 | Stewart et al. | |

* cited by examiner

*Data Center 100*

| Sled Space 803-1 | |
|---|---|
| Exp'n Region 803-1B | Primary Region 803-1A<br>MPCM 816-1 |

| Sled Space 803-2 | |
|---|---|
| Exp'n Region 803-2B | Primary Region 803-2A<br>MPCM 816-2 |

| Sled Space 803-3 | |
|---|---|
| Exp'n Region 803-3B | Primary Region 803-3A<br>MPCM 816-3 |

| Sled Space 803-4 | |
|---|---|
| Exp'n Region 803-4B | Primary Region 803-4A<br>MPCM 816-4 |

| Sled Space 803-5 | |
|---|---|
| Exp'n Region 803-5B | Primary Region 803-5A<br>MPCM 816-5 |

| Sled Space 803-6 | |
|---|---|
| Exp'n Region 803-6B | Primary Region 803-6A<br>MPCM 816-6 |

| Sled Space 803-7 | |
|---|---|
| Exp'n Region 803-7B | Primary Region 803-7A<br>MPCM 816-7 |

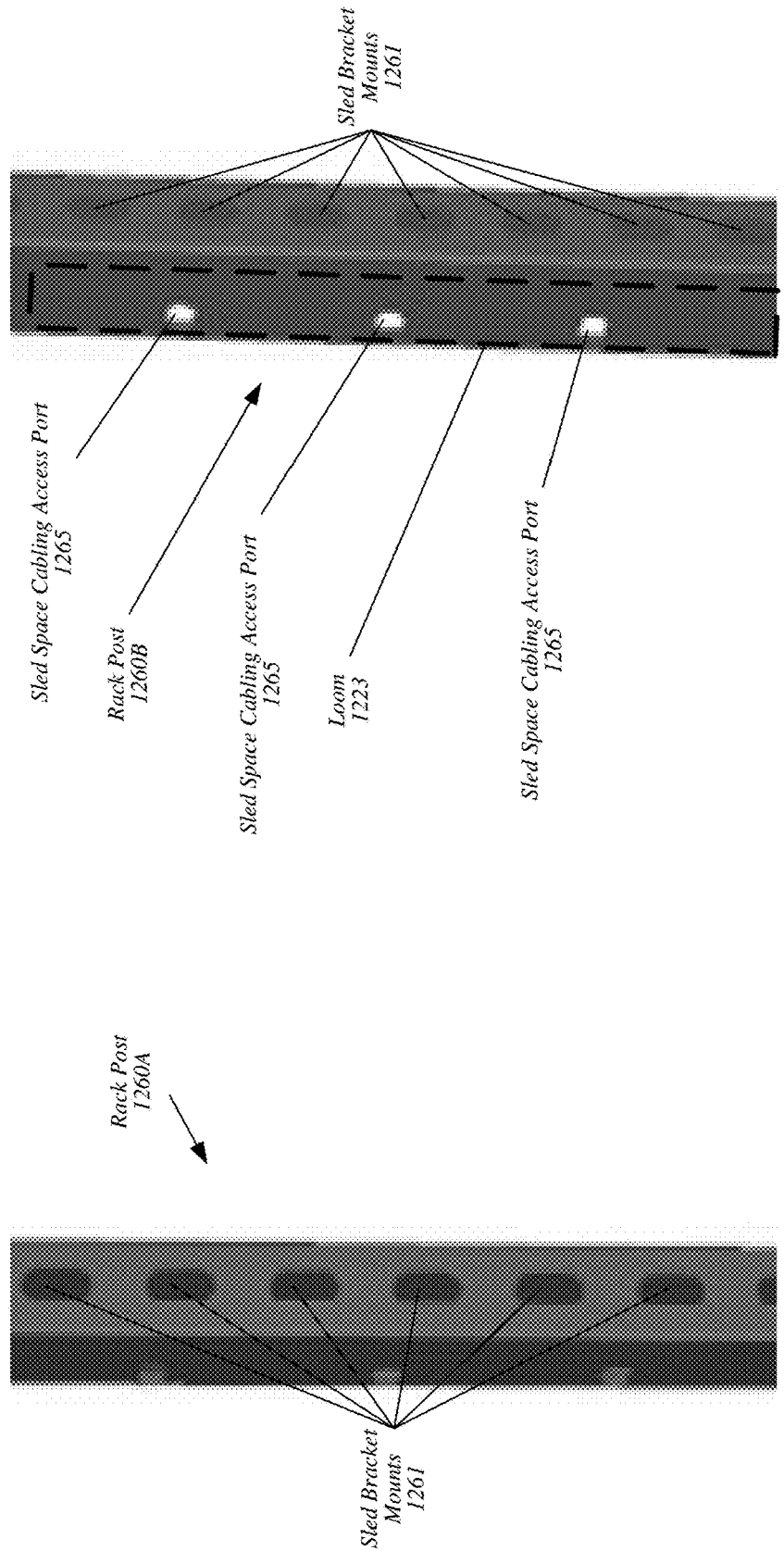

*Logic Flow*
*2100*

ROBOTICALLY SERVICEABLE COMPUTING RACK AND SLEDS

RELATED CASE

This application claims priority to U.S. Provisional Patent Application entitled "Framework and Techniques for Pools of Configurable Computing Resources" filed on Nov. 29, 2016 and assigned Ser. No. 62/427,268; U.S. Provisional Patent Application entitled "Scalable System Framework Prime (SSFP) Omnibus Provisional II" filed on Aug. 18, 2016 and assigned Ser. No. 62/376,859; and U.S. Provisional Patent Application entitled "Framework and Techniques for Pools of Configurable Computing Resources" filed on Jul. 22, 2016 and assigned Ser. No. 62/365,969, each of which is hereby incorporated by reference in their entirety.

TECHNICAL FIELD

Embodiments described herein generally relate to data centers and particularly to racks within a data center.

BACKGROUND

Advancements in networking have enabled the rise in pools of configurable computing resources. A pool of configurable computing resources may be formed from a physical infrastructure including disaggregate physical resources, for example, as found in large data centers. The physical infrastructure can include a number of resources having processors, memory, storage, networking, power, cooling, etc. Management entities of these data centers can aggregate a selection of the resources to form servers and/or computing hosts. These hosts can subsequently be allocated to execute and/or host system SW (e.g., OSs, VMs, Containers, Applications, or the like). A number of challenges to conventional data centers exist. For example, managing (e.g., installing, replacing, performing maintenance, or the like) the volume of physical resources spread throughout the data center can be a challenge. Additionally, managing the heat generated by the large number of physical resources can be a challenge.

BRIEF DESCRIPTION OF THE DRAWINGS

FIG. 8 illustrates a third example rack.
FIGS. 12A-12E illustrate a fifth example rack.

DETAILED DESCRIPTION

Figure 1:
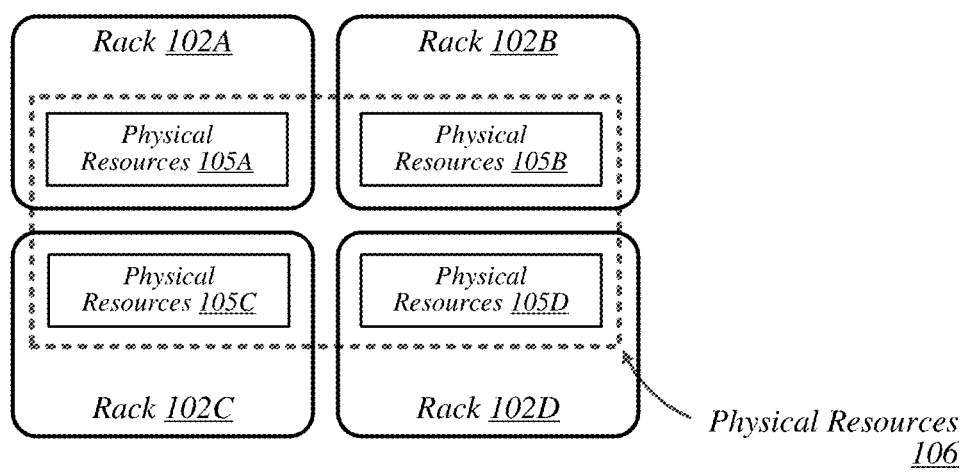
FIG. 1 illustrates a first example data center.

Data centers may generally be composed of a large number of racks that can contain numerous types of hardware or configurable resources (e.g., processing units, memory, storage, accelerators, networking, fans/cooling modules, power units, etc.). The types of hardware or configurable resources deployed in data centers may also be referred to as physical resources or disaggregate elements. It is to be appreciated, that the size and number of physical resources within a data center can be large, for example, on the order of hundreds of thousands of physical resources. These physical resources can be pooled to form virtual computing platforms for a large number and variety of computing tasks.

Furthermore, these physical resources are often arranged in racks located in a warehouse, or multiple warehouses. The present disclosure provides racks arranged to accept sleds and sleds arranged to house a number of physical resources. The racks and sleds described herein are arranged to be robotically manipulated; thus, providing a data center where the physical resources as housed in sleds and racks can be serviced (e.g., installed, replaced, removed, manipulated, checked, or the like) robotically. Said differently, the sleds can be installed and/or removed from the racks without human assistance. Additionally, at least some of the physical resources can be removed from the sled without human assistance. For example, a robot (e.g., robotic arm, fork apparatus, or the like) can be utilized to install and remove sleds from racks. These, and other features of the present disclosure will be described in greater detail below.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, known structures and devices are shown in block diagram form in order to facilitate a description thereof. The intention is to provide a thorough description such that all modifications, equivalents, and alternatives within the scope of the claims are sufficiently described.

Additionally, reference may be made to variables, such as, "a", "b", "c", which are used to denote components where more than one component may be implemented. It is important to note, that there need not necessarily be multiple components and further, where multiple components are implemented, they need not be identical. Instead, use of variables to reference components in the figures is done for convenience and clarity of presentation.

FIG. 1 illustrates a conceptual overview of a data center 100 that may generally be representative of a data center or other type of computing network in/for which one or more techniques described herein may be implemented according to various embodiments. As shown in this figure, data center 100 may generally contain a plurality of racks, each of which may house computing equipment comprising a respective set of physical resources. In the particular non-limiting example depicted in FIG. 1, data center 100 contains four racks 102A to 102D, which house computing equipment comprising respective sets of physical resources (PCRs) 105A to 105D. The present disclosure provides a number of example racks (refer to at least FIGS. 2, 6, 8-9, 12A-12E, and 17-18). A more detailed description of these example racks and feature of these racks to facilitate automated (and/or robotic) manipulation is given below in conjunction with the description of these figures. According to the example of FIG. 1, a collective set of physical resources 106 of data center 100 includes the various sets of physical resources 105A to 105D that are distributed among racks 102A to 102D. Physical resources 106 may include resources of multiple types, such as—for example—processors, co-processors, accelerators, field-programmable gate arrays (FPGAs), graphics processing units (GPUs), memory, interconnect components, and storage. The embodiments are not limited to these examples.

The illustrative data center 100 differs from typical data centers in many ways. For example, in the illustrative embodiment, the circuit boards ("sleds") on which components such as CPUs, memory, and other components are placed are designed for increased thermal performance. In particular, in the illustrative embodiment, the sleds are shallower than typical boards. In other words, the sleds are shorter from the front to the back, where cooling fans are located. This decreases the length of the path that air must travel across the components on the board. Further, the components on the sled are spaced further apart than in typical circuit boards, and the components are arranged to reduce or eliminate shadowing (i.e., one component in the air flow path of another component). In the illustrative embodiment, processing components such as the processors are located on a top side of a sled while near memory, such as DIMMs, are located on a bottom side of the sled. As a result of the enhanced airflow provided by this design, the components may operate at higher frequencies and power levels than in typical systems, thereby increasing performance. Furthermore, the sleds are configured to blindly mate with power and data communication cables in each rack 102A, 102B, 102C, 102D, enhancing their ability to be quickly removed, upgraded, reinstalled, and/or replaced. Similarly, individual components located on the sleds, such as processors, accelerators, memory, and data storage drives, are configured to be easily upgraded due to their increased spacing from each other. In the illustrative embodiment, the components additionally include hardware attestation features to prove their authenticity.

Furthermore, in the illustrative embodiment, the data center 100 utilizes a single network architecture ("fabric") that supports multiple other network architectures including Ethernet and Omni-Path. The sleds, in the illustrative embodiment, are coupled to switches via optical fibers, which provide higher bandwidth and lower latency than typical twisted pair cabling (e.g., Category 5, Category 5e, Category 6, etc.). Due to the high bandwidth, low latency interconnections and network architecture, the data center 100 may, in use, pool resources, such as memory, accelerators (e.g., graphics accelerators, FPGAs, ASICs, etc.), and data storage drives that are physically disaggregated, and provide them to compute resources (e.g., processors) on an as needed basis, enabling the compute resources to access the pooled resources as if they were local. The illustrative data center 100 additionally receives usage information for the various resources, predicts resource usage for different types of workloads based on past resource usage, and dynamically reallocates the resources based on this information.

The racks 102A to 102D of the data center 100 may include physical design features that facilitate the automation of a variety of types of maintenance tasks. For example, data center 100 may be implemented using racks that are designed to be robotically-accessed, and to accept and house robotically-manipulable resource sleds. Furthermore, in some embodiments, the racks 102A to 102D include integrated power sources that receive a greater voltage than is typical for power sources. The increased voltage enables the power sources to provide additional power to the components on each sled, enabling the components to operate at higher than typical frequencies.

Figure 2:
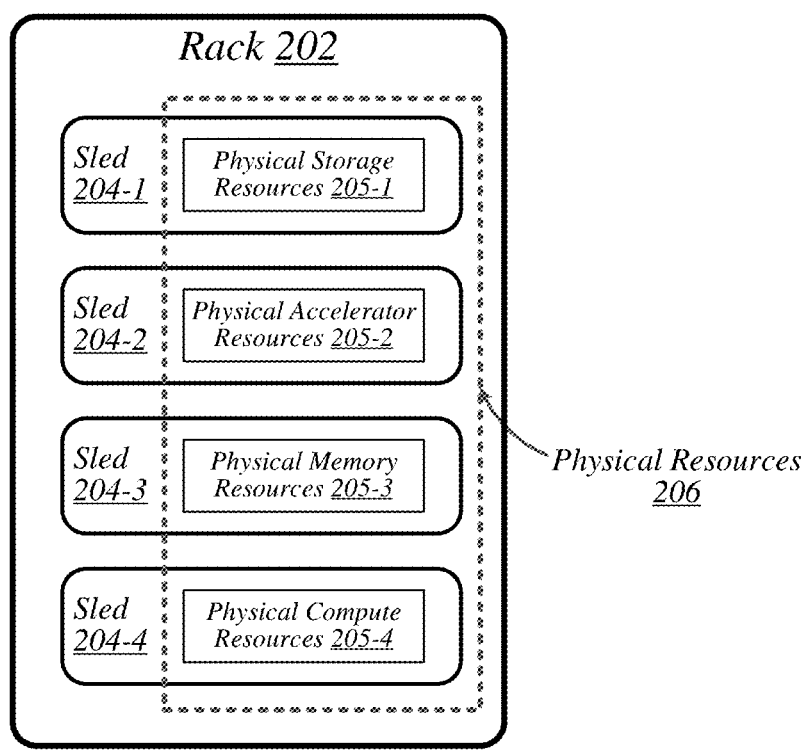
FIG. 2 illustrates a first example rack of a data center.

FIG. 2 illustrates an exemplary logical configuration of a rack 202 of the data center 100. As shown in FIG. 2, rack 202 may generally house a plurality of sleds, each of which may comprise a respective set of physical resources. In the particular non-limiting example depicted in this figure, rack 202 houses sleds 204-1 to 204-4 comprising respective sets of physical resources 205-1 to 205-4, each of which constitutes a portion of the collective set of physical resources 206 comprised in rack 202. With respect to FIG. 1, if rack 202 is representative of—for example—rack 102A, then physical resources 206 may correspond to the physical resources 105A comprised in rack 102A. The present disclosure provides a number of example sleds housing physical resources (refer to at least FIGS. 7, 10, and 15A-15C). A more detailed description of these example sleds and feature of these sleds to facilitate automated (and/or robotic) manipulation is given below in conjunction with the description of these figures.

In the context depicted in the example of FIG. 2, physical resources 105A may thus be made up of the respective sets of physical resources 205-1 to 205-4 comprised in the sleds 204-1 to 204-4 of rack 202. As depicted in this illustrative embodiment, physical resources 205-1 to 205-4 include physical storage resources 205-1, physical accelerator resources 205-2, physical memory resources 205-3, and physical compute resources 205-4. The embodiments are not limited to this example. Each sled may contain a pool of any combination of the various types of physical resources (e.g., compute, memory, accelerator, storage). By having robotically accessible and robotically manipulable sleds comprising disaggregated resources, each type of resource can be upgraded independently of each other and at their own optimized refresh rate.

Figure 3:
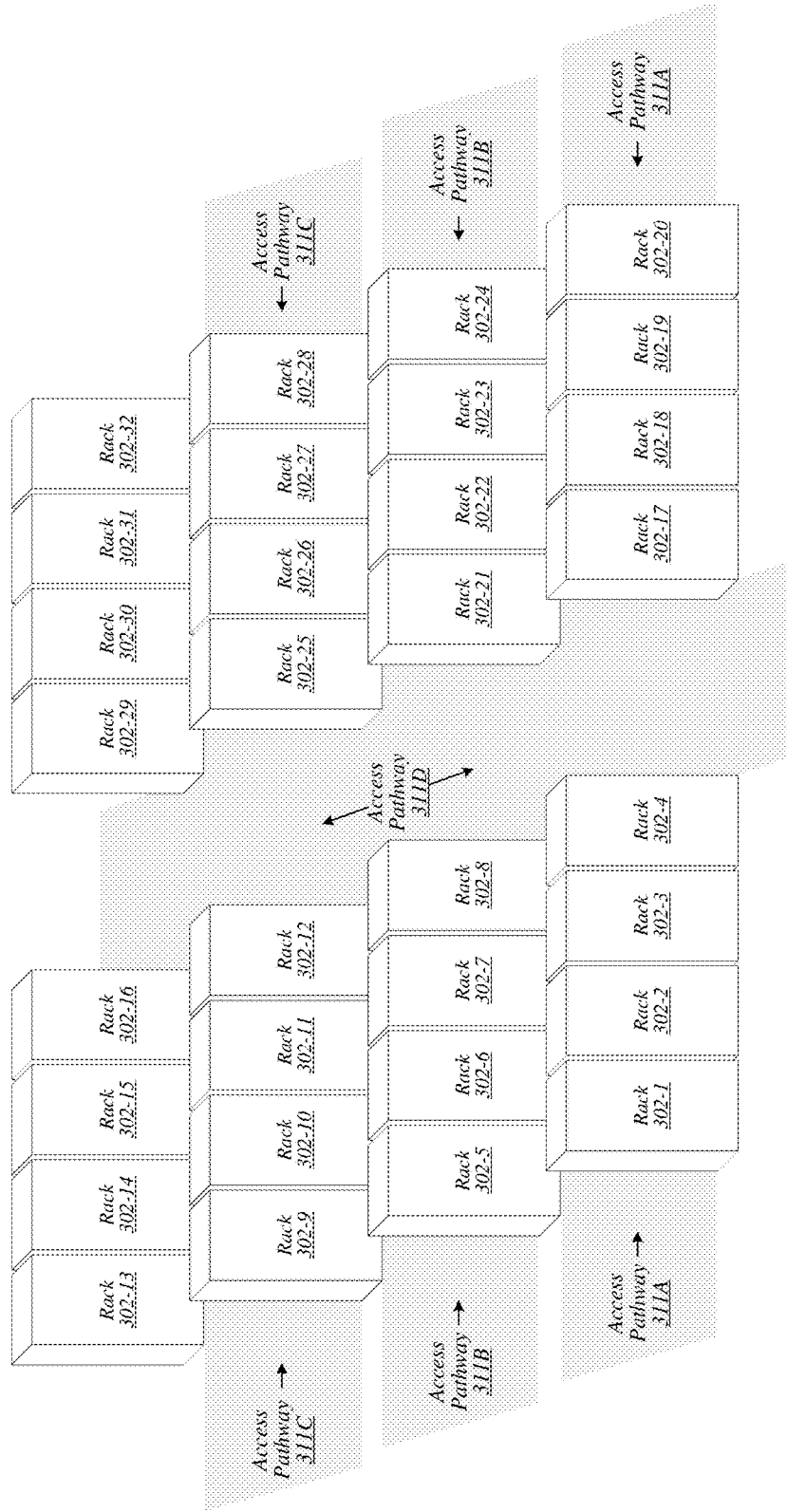
FIG. 3 illustrates a second example data center.

FIG. 3 illustrates an example of a data center 300 that may generally be representative of one in/for which one or more techniques described herein may be implemented according to various embodiments. In the particular non-limiting example depicted in FIG. 3, data center 300 comprises racks 302-1 to 302-32. In various embodiments, the racks of data center 300 may be arranged in such a fashion as to define and/or accommodate various access pathways. For example, as shown in FIG. 3, the racks of data center 300 may be arranged in such a fashion as to define and/or accommodate access pathways 311A, 311B, 311C, and 311D. In some embodiments, the presence of such access pathways may generally enable automated maintenance equipment, such as robotic maintenance equipment (e.g., refer to FIG. 19) to physically access the computing equipment housed in the various racks of data center 300 and perform automated maintenance tasks (e.g., replace a failed sled, upgrade a sled). In various embodiments, the dimensions of access pathways 311A, 311B, 311C, and 311D, the dimensions of racks 302-1 to 302-32, and/or one or more other aspects of the physical layout of data center 300 may be selected to facilitate such automated operations. The embodiments are not limited in this context.

Figure 4:
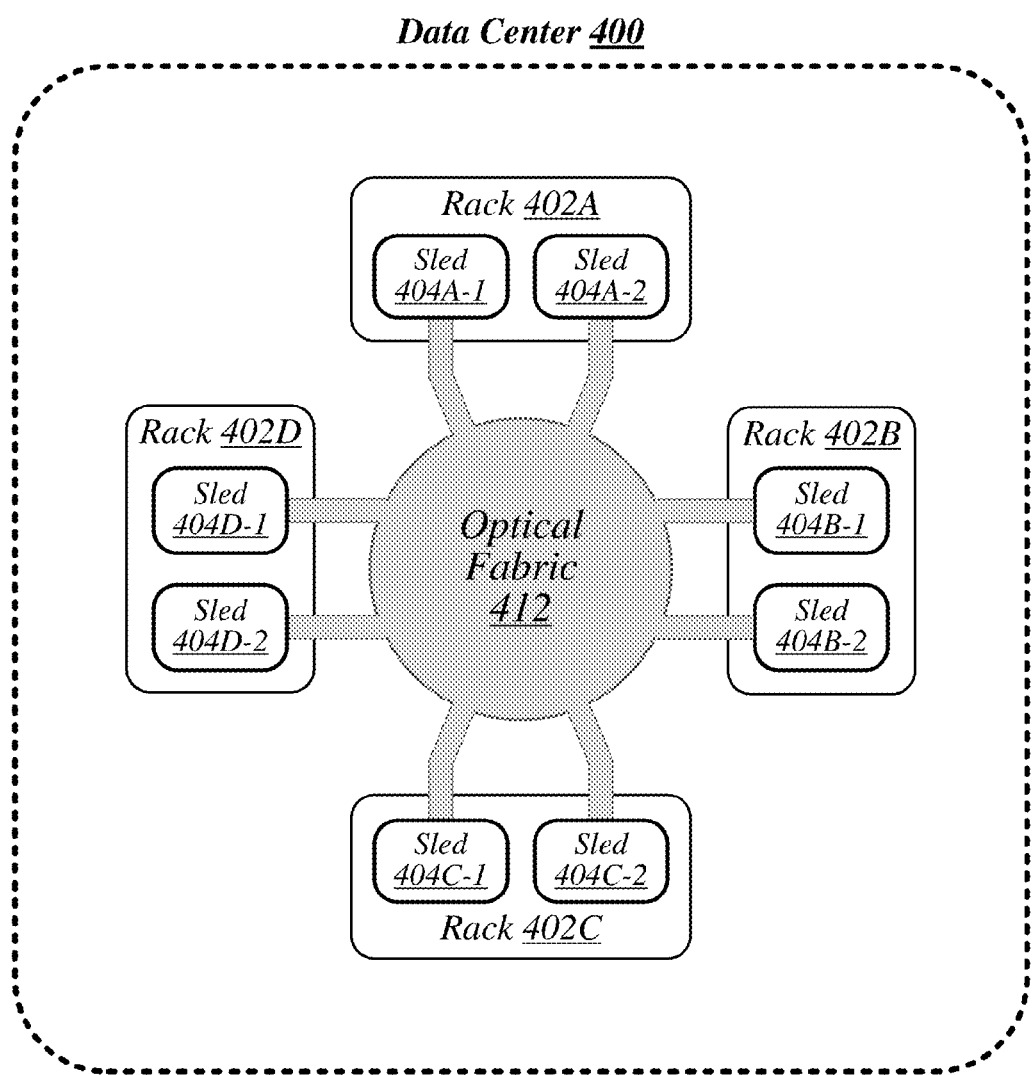
FIG. 4 illustrates a third example data center.

FIG. 4 illustrates an example of a data center 400 that may generally be representative of one in/for which one or more techniques described herein may be implemented according to various embodiments. As shown in FIG. 4, data center 400 may feature an optical fabric 412. Optical fabric 412 may generally comprise a combination of optical signaling media (such as optical cabling) and optical switching infrastructure via which any particular sled in data center 400 can send signals to (and receive signals from) each of the other sleds in data center 400. The signaling connectivity that optical fabric 412 provides to any given sled may include connectivity both to other sleds in a same rack and sleds in other racks. In the particular non-limiting example depicted in FIG. 4, data center 400 includes four racks 402A to 402D. Racks 402A to 402D house respective pairs of sleds 404A-1 and 404A-2, 404B-1 and 404B-2, 404C-1 and 404C-2, and 404D-1 and 404D-2. Thus, in this example, data center 400 comprises a total of eight sleds. Via optical fabric 412, each such sled may possess signaling connectivity with each of the seven other sleds in data center 400. For example, via optical fabric 412, sled 404A-1 in rack 402A may possess signaling connectivity with sled 404A-2 in rack 402A, as well as the six other sleds 404B-1, 404B-2, 404C-1, 404C-2, 404D-1, and 404D-2 that are distributed among the other racks 402B, 402C, and 402D of data center 400. The embodiments are not limited to this example.

Figure 5:
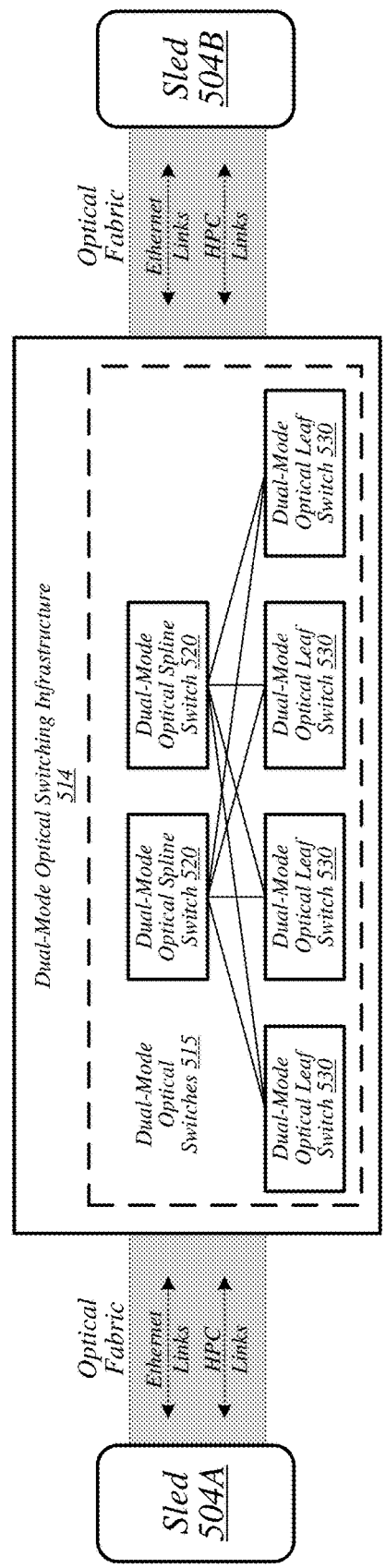
FIG. 5 illustrates a data center connectivity scheme.

FIG. 5 illustrates an overview of a connectivity scheme 500 that may generally be representative of link-layer connectivity that may be established in some embodiments among the various sleds of a data center, such as any of example data centers 100, 300, and 400 of FIGS. 1, 3, and 4. Connectivity scheme 500 may be implemented using an optical fabric that features a dual-mode optical switching infrastructure 514. Dual-mode optical switching infrastructure 514 may generally comprise a switching infrastructure that is capable of receiving communications according to multiple link-layer protocols via a same unified set of optical signaling media, and properly switching such communications. In various embodiments, dual-mode optical switching infrastructure 514 may be implemented using one or more dual-mode optical switches 515. In various embodiments, dual-mode optical switches 515 may generally comprise high-radix switches. In some embodiments, dual-mode optical switches 515 may comprise multi-ply switches, such as four-ply switches. In various embodiments, dual-mode optical switches 515 may feature integrated silicon photonics that enable them to switch communications with significantly reduced latency in comparison to conventional switching devices. In some embodiments, dual-mode optical switches 515 may constitute leaf switches 530 in a leaf-spine architecture additionally including one or more dual-mode optical spine switches 520.

In various embodiments, dual-mode optical switches may be capable of receiving both Ethernet protocol communications carrying Internet Protocol (IP packets) and communications according to a second, high-performance computing (HPC) link-layer protocol (e.g., Intel's Omni-Path Architecture's, Infiniband) via optical signaling media of an optical fabric. As reflected in FIG. 5, with respect to any particular pair of sleds 504A and 504B possessing optical signaling connectivity to the optical fabric, connectivity scheme 500 may thus provide support for link-layer connectivity via both Ethernet links and HPC links. Thus, both Ethernet and HPC communications can be supported by a single high-bandwidth, low-latency switch fabric. The embodiments are not limited to this example.

Figure 6:
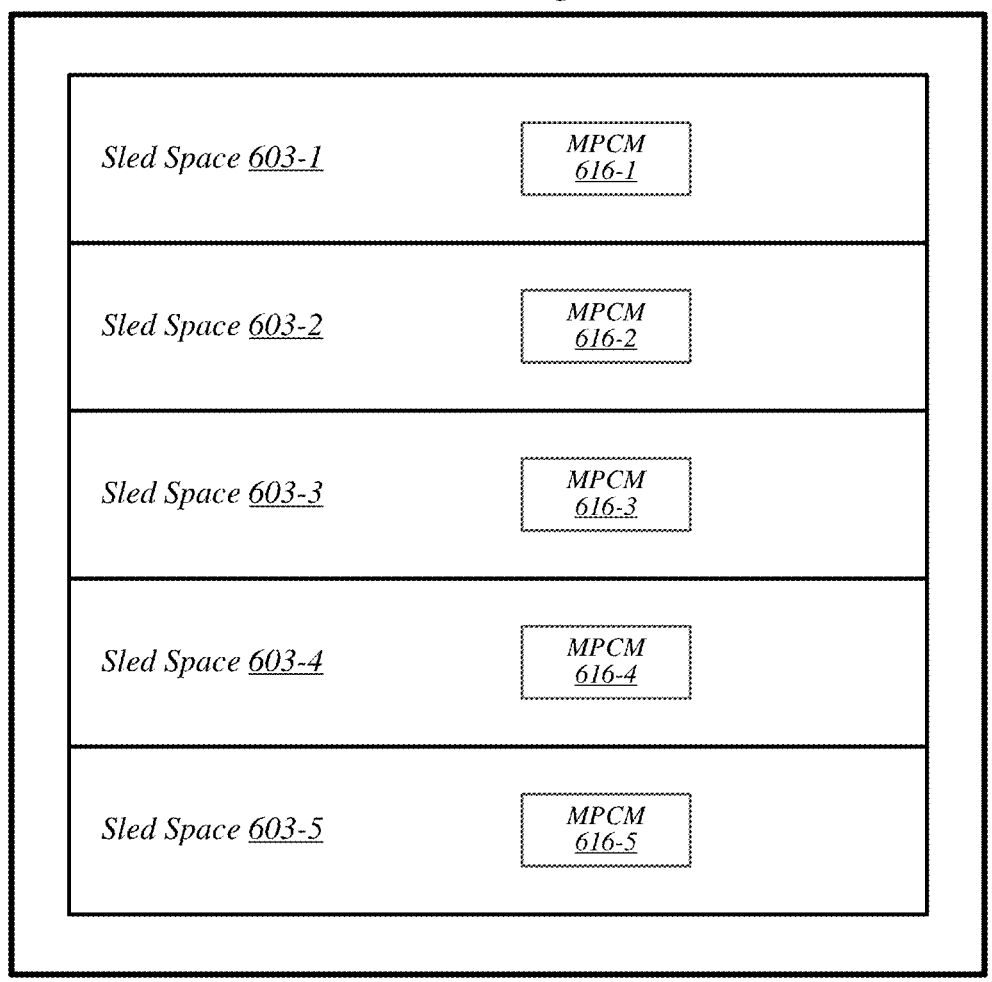
FIG. 6 illustrates a second example rack.

FIG. 6 illustrates a general overview of a rack architecture 600 that may be representative of an architecture of any particular one of the racks depicted in FIGS. 1 to 4 according to some embodiments. As reflected in FIG. 6, rack architecture 600 may generally feature a plurality of sled spaces into which sleds may be inserted, each of which may be robotically-accessible via a rack access region 601. In the particular non-limiting example depicted in FIG. 6, rack architecture 600 features five sled spaces 603-1 to 603-5. Sled spaces 603-1 to 603-5 feature respective multi-purpose connector modules (MPCMs) 616-1 to 616-5.

Figure 7:
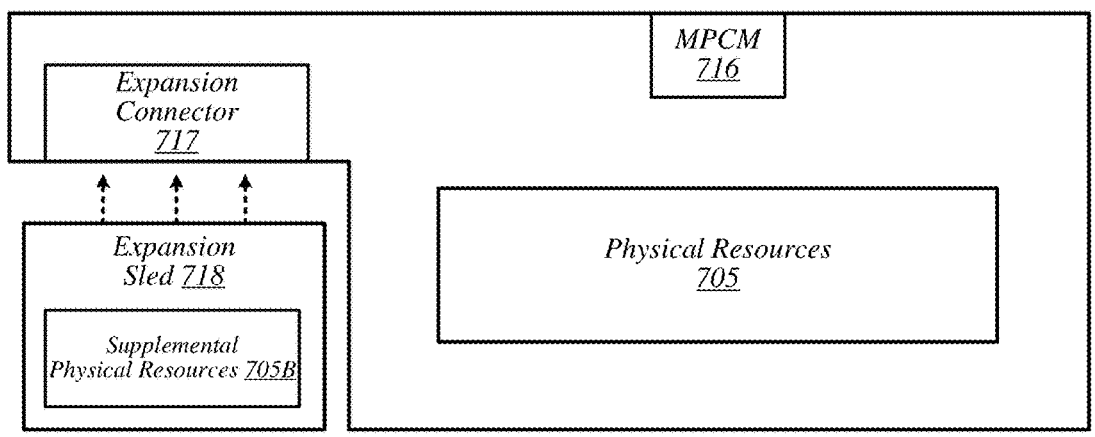
FIG. 7 illustrates a first example sled.

Included among the types of sleds to be accommodated by rack architecture 600 may be one or more types of sleds that feature expansion capabilities. FIG. 7 illustrates an example of a sled 704 that may be representative of a sled of such a type. As shown in FIG. 7, sled 704 may comprise a set of physical resources 705, as well as an MPCM 716 designed to couple with a counterpart MPCM when sled 704 is inserted into a sled space such as any of sled spaces 603-1 to 603-5 of FIG. 6. Sled 704 may also feature an expansion connector 717. Expansion connector 717 may generally comprise a socket, slot, or other type of connection element that is capable of accepting one or more types of expansion modules, such as an expansion sled 718. By coupling with a counterpart connector on expansion sled 718, expansion connector 717 may provide physical resources 705 with access to supplemental computing resources 705B residing on expansion sled 718. The embodiments are not limited in this context.

FIG. 8 illustrates an example of a rack architecture 800 that may be representative of a rack architecture that may be implemented in order to provide support for sleds featuring expansion capabilities, such as sled 704 of FIG. 7. In the particular non-limiting example depicted in FIG. 8, rack architecture 800 includes seven sled spaces 803-1 to 803-7, which feature respective MPCMs 816-1 to 816-7. Sled spaces 803-1 to 803-7 include respective primary regions 803-1A to 803-7A and respective expansion regions 803-1B to 803-7B. With respect to each such sled space, when the corresponding MPCM is coupled with a counterpart MPCM of an inserted sled, the primary region may generally constitute a region of the sled space that physically accommodates the inserted sled. The expansion region may generally constitute a region of the sled space that can physically accommodate an expansion module, such as expansion sled 718 of FIG. 7, in the event that the inserted sled is configured with such a module.

Figure 9:
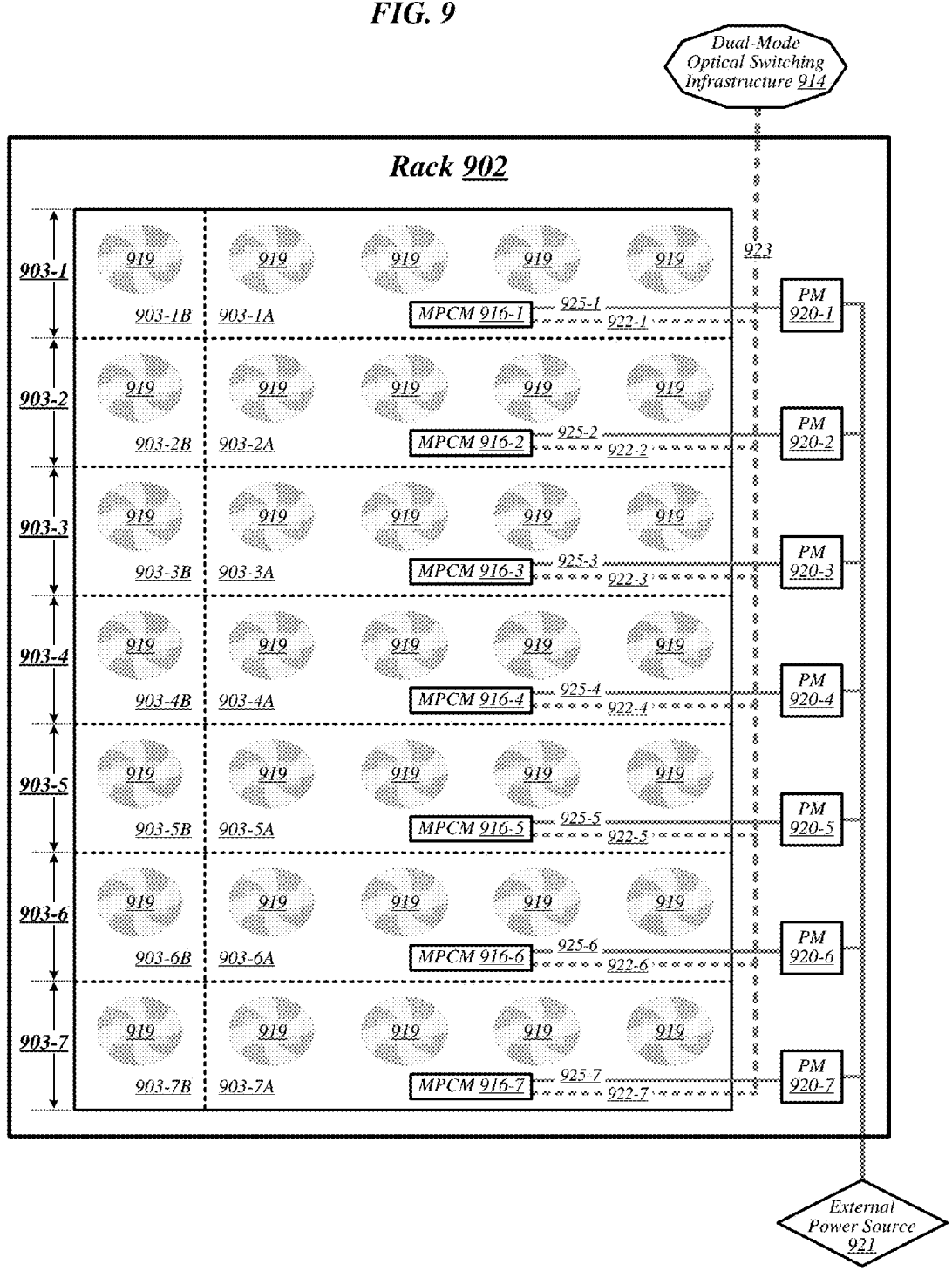
FIG. 9 illustrates a fourth example rack.

FIG. 9 illustrates an example of a rack 902 that may be representative of a rack implemented according to rack architecture 800 of FIG. 8 according to some embodiments. In the particular non-limiting example depicted in FIG. 9, rack 902 features seven sled spaces 903-1 to 903-7, which include respective primary regions 903-1A to 903-7A and respective expansion regions 903-1B to 903-7B. In various embodiments, temperature control in rack 902 may be implemented using an air cooling system. For example, as reflected in FIG. 9, rack 902 may feature a plurality of fans 919 that are generally arranged to provide air cooling within the various sled spaces 903-1 to 903-7. In some embodiments, the height of the sled space is greater than the conventional "1U" server height. In such embodiments, fans 919 may generally comprise relatively slow, large diameter cooling fans as compared to fans used in conventional rack configurations. Running larger diameter cooling fans at lower speeds may increase fan lifetime relative to smaller diameter cooling fans running at higher speeds while still providing the same amount of cooling. The sleds are physically shallower than conventional rack dimensions. Further, components are arranged on each sled to reduce thermal shadowing (i.e., not arranged serially in the direction of air flow). As a result, the wider, shallower sleds allow for an increase in device performance because the devices can be operated at a higher thermal envelope (e.g., 250 W) due to improved cooling (i.e., no thermal shadowing, more space between devices, more room for larger heat sinks, etc.).

MPCMs 916-1 to 916-7 may be configured to provide inserted sleds with access to power sourced by respective power modules 920-1 to 920-7, each of which may draw power from an external power source 921. In various embodiments, external power source 921 may deliver alternating current (AC) power to rack 902, and power modules 920-1 to 920-7 may be configured to convert such AC power to direct current (DC) power to be sourced to inserted sleds. In some embodiments, for example, power modules 920-1 to 920-7 may be configured to convert 277-volt AC power into 12-volt DC power for provision to inserted sleds via respective MPCMs 916-1 to 916-7. In some examples, MPCMs 916-1 to 916-7 can be coupled to respective power modules 920-1 to 920-7 via electrical power cabling 925-1 to 925-7. The embodiments are not limited to this example.

MPCMs 916-1 to 916-7 may also be arranged to provide inserted sleds with optical signaling connectivity to a dual-mode optical switching infrastructure 914, which may be the same as—or similar to—dual-mode optical switching infrastructure 514 of FIG. 5. In various embodiments, optical connectors contained in MPCMs 916-1 to 916-7 may be designed to couple with counterpart optical connectors contained in MPCMs of inserted sleds to provide such sleds with optical signaling connectivity to dual-mode optical switching infrastructure 914 via respective lengths of optical cabling 922-1 to 922-7. In some embodiments, each such length of optical cabling may extend from its corresponding MPCM to an optical interconnect A data 923 that is external to the sled spaces of rack 902. In various embodiments, optical interconnect loom 923 may be arranged to pass through a support post or other type of load-bearing element of rack 902. The embodiments are not limited in this context. Because inserted sleds connect to an optical switching infrastructure via MPCMs, the resources typically spent in manually configuring the rack cabling to accommodate a newly inserted sled can be saved.

Figure 10:
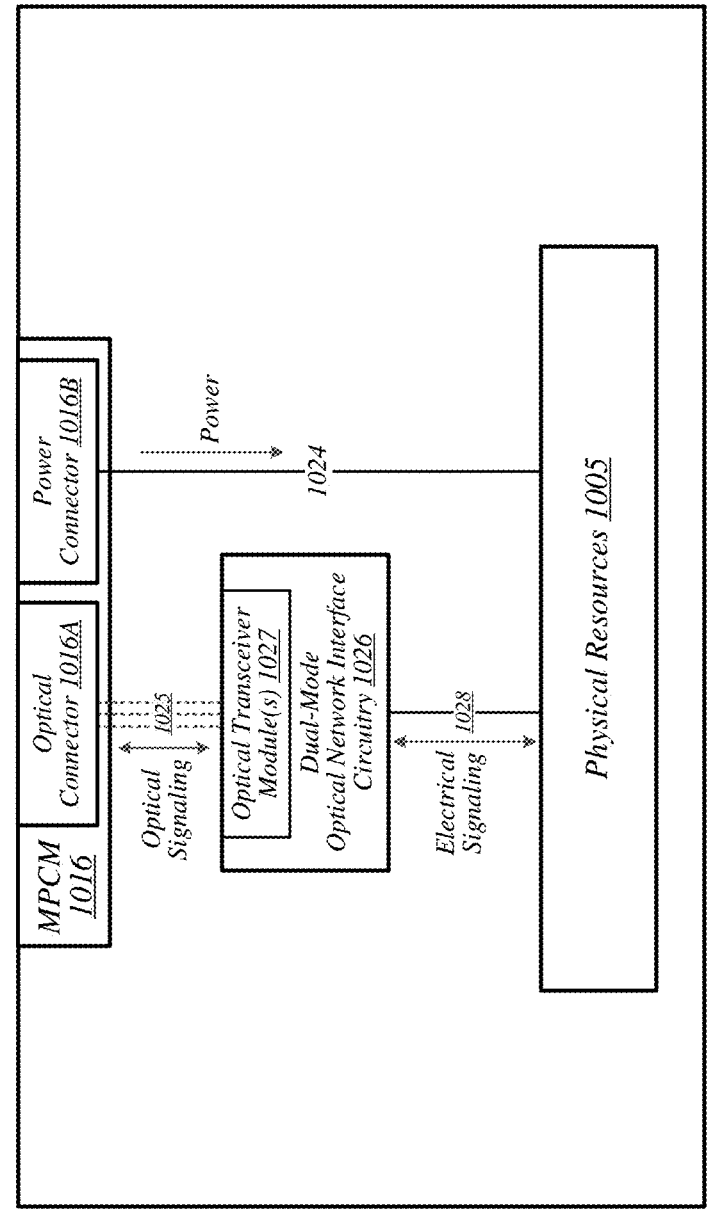
FIG. 10 illustrates a second example sled.

FIG. 10 illustrates an example of a sled 1004 that may be representative of a sled designed for use in conjunction with rack 902 of FIG. 9 according to some embodiments. Sled 1004 may feature an MPCM 1016 that comprises an optical connector 1016A and a power connector 1016B, and that is designed to couple with a counterpart MPCM of a sled space in conjunction with insertion of MPCM 1016 into that sled space. Coupling MPCM 1016 with such a counterpart MPCM may cause power connector 1016B to couple with a power connector comprised in the counterpart MPCM. This may generally enable physical resources 1005 of sled 1004 to source power from an external source, via power connector 1016B and power transmission media 1024 that conductively couples power connector 1016B to physical resources 1005.

Sled 1004 may also include dual-mode optical network interface circuitry 1026. Dual-mode optical network interface circuitry 1026 may generally comprise circuitry that is capable of communicating over optical signaling media according to each of multiple link-layer protocols supported by dual-mode optical switching infrastructure (e.g., 514 of FIG. 5, 914 of FIG. 9, or the like). In some embodiments, dual-mode optical network interface circuitry 1026 may be capable both of Ethernet protocol communications and of communications according to a second, high-performance protocol. In various embodiments, dual-mode optical network interface circuitry 1026 may include one or more optical transceiver modules 1027, each of which may be capable of transmitting and receiving optical signals over each of one or more optical channels. The embodiments are not limited in this context.

Coupling MPCM 1016 with a counterpart MPCM of a sled space in a given rack may cause optical connector 1016A to couple with an optical connector comprised in the counterpart MPCM. This may generally establish optical connectivity between optical cabling of the sled and dual-mode optical network interface circuitry 1026, via each of a set of optical channels 1025. Dual-mode optical network interface circuitry 1026 may communicate with the physical resources 1005 of sled 1004 via electrical signaling media 1028. In addition to the dimensions of the sleds and arrangement of components on the sleds to provide improved cooling and enable operation at a relatively higher thermal envelope (e.g., 250 W), as described above with reference to FIG. 9, in some embodiments, a sled may include one or more additional features to facilitate air cooling, such as a heatpipe and/or heat sinks arranged to dissipate heat generated by physical resources 1005. It is worthy of note that although the example sled 1004 depicted in FIG. 10 does not feature an expansion connector, any given sled that features the design elements of sled 1004 may also feature an expansion connector according to some embodiments. The embodiments are not limited in this context.

Figure 11:
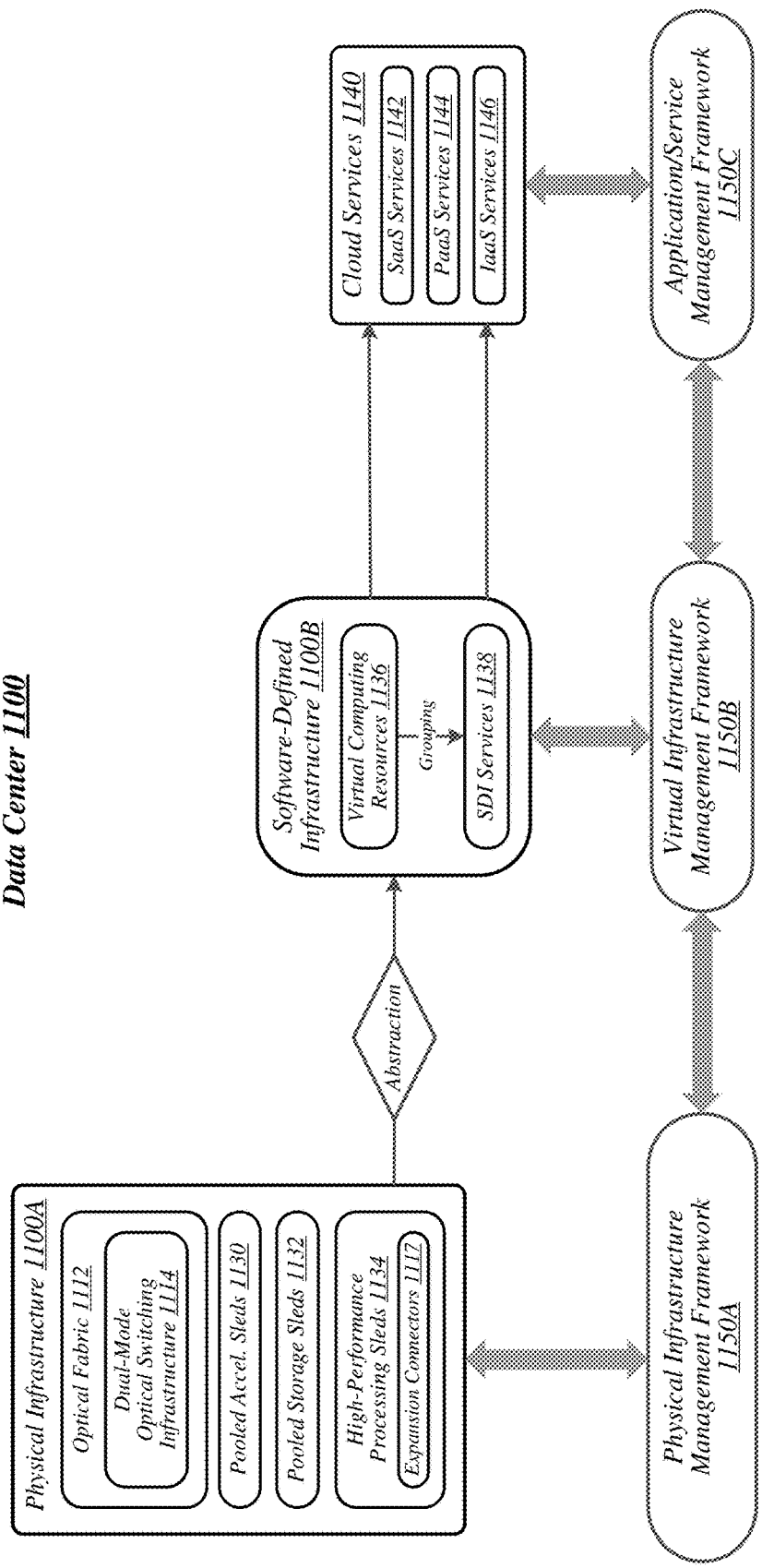
FIG. 11 illustrates a fourth example data center.

FIG. 11 illustrates an example of a data center 1100 that may generally be representative of one in/for which one or more techniques described herein may be implemented according to various embodiments. As reflected in FIG. 11, a physical infrastructure management framework 1150A may be implemented to facilitate management of a physical infrastructure 1100A of data center 1100. In various embodiments, one function of physical infrastructure management framework 1150A may be to manage automated maintenance functions within data center 1100, such as the use of robotic maintenance equipment to service computing equipment within physical infrastructure 1100A. In some embodiments, physical infrastructure 1100A may feature an advanced telemetry system that performs telemetry reporting that is sufficiently robust to support remote automated management of physical infrastructure 1100A. In various embodiments, telemetry information provided by such an advanced telemetry system may support features such as failure prediction/prevention capabilities and capacity planning capabilities. In some embodiments, physical infrastructure management framework 1150A may also be configured to manage authentication of physical infrastructure components using hardware attestation techniques. For example, robots may verify the authenticity of components before installation by analyzing information collected from a radio frequency identification (RFID) tag associated with each component to be installed. The embodiments are not limited in this context.

As shown in FIG. 11, the physical infrastructure 1100A of data center 1100 may comprise an optical fabric 1112, which may include a dual-mode optical switching infrastructure 1114. Optical fabric 1112 and dual-mode optical switching infrastructure 1114 may be the same as—or similar to—optical fabric 412 of FIG. 4 and dual-mode optical switching infrastructure 514 of FIG. 5, respectively, and may provide high-bandwidth, low-latency, multi-protocol connectivity among sleds of data center 1100. As discussed above, with reference to FIG. 1, in various embodiments, the availability of such connectivity may make it feasible to disaggregate and dynamically pool resources such as accelerators, memory, and storage. In some embodiments, for example, one or more pooled accelerator sleds 1130 may be included among the physical infrastructure 1100A of data center 1100, each of which may comprise a pool of accelerator resources—such as co-processors and/or FPGAs, for example—that is globally accessible to other sleds via optical fabric 1112 and dual-mode optical switching infrastructure 1114.

In another example, in various embodiments, one or more pooled storage sleds 1132 may be included among the physical infrastructure 1100A of data center 1100, each of which may comprise a pool of storage resources that is available globally accessible to other sleds via optical fabric 1112 and dual-mode optical switching infrastructure 1114. In some embodiments, such pooled storage sleds 1132 may comprise pools of solid-state storage devices such as solid-state drives (SSDs). In various embodiments, one or more high-performance processing sleds 1134 may be included among the physical infrastructure 1100A of data center 1100. In some embodiments, high-performance processing sleds 1134 may comprise pools of high-performance processors, as well as cooling features that enhance air cooling to yield a higher thermal envelope of up to 250 W or more. In various embodiments, any given high-performance processing sled 1134 may feature an expansion connector 1117 that can accept a far memory expansion sled, such that the far memory that is locally available to that high-performance processing sled 1134 is disaggregated from the processors and near memory comprised on that sled. In some embodiments, such a high-performance processing sled 1134 may be configured with far memory using an expansion sled that comprises low-latency SSD storage. The optical infrastructure allows for compute resources on one sled to utilize remote accelerator/FPGA, memory, and/or SSD resources that are disaggregated on a sled located on the same rack or any other rack in the data center. The remote resources can be located one switch jump away or two-switch jumps away in the spine-leaf network architecture described above with reference to FIG. 5. The embodiments are not limited in this context.

In various embodiments, one or more layers of abstraction may be applied to the physical resources of physical infrastructure 1100A in order to define a virtual infrastructure, such as a software-defined infrastructure 1100B. In some embodiments, virtual computing resources 1136 of software-defined infrastructure 1100B may be allocated to support the provision of cloud services 1140. In various embodiments, particular sets of virtual computing resources 1136 may be grouped for provision to cloud services 1140 in the form of SDI services 1138. Examples of cloud services 1140 may include—without limitation—software as a service (SaaS) services 1142, platform as a service (PaaS) services 1144, and infrastructure as a service (IaaS) services 1146.

In some embodiments, management of software-defined infrastructure 1100B may be conducted using a virtual infrastructure management framework 1150B. In various embodiments, virtual infrastructure management framework 1150B may be designed to implement workload fingerprinting techniques and/or machine-learning techniques in conjunction with managing allocation of virtual computing resources 1136 and/or SDI services 1138 to cloud services 1140. In some embodiments, virtual infrastructure management framework 1150B may use/consult telemetry data in conjunction with performing such resource allocation. In various embodiments, an application/service management framework 1150C may be implemented in order to provide QoS management capabilities for cloud services 1140. The embodiments are not limited in this context.

FIGS. 12A-12E illustrate perspective views of a rack 1202 that may be representative of a rack implemented according to some embodiments. In the particular non-limiting example depicted in this figure, rack 1202 can include multiple components arranged to form rack 1202. In general, a complete depiction of rack 1202 is given with respect to FIG. 12A while depictions of individual components and/or alternative perspective views of rack 1202 are given with respect to FIGS. 12B-12E.

Figure 12A:
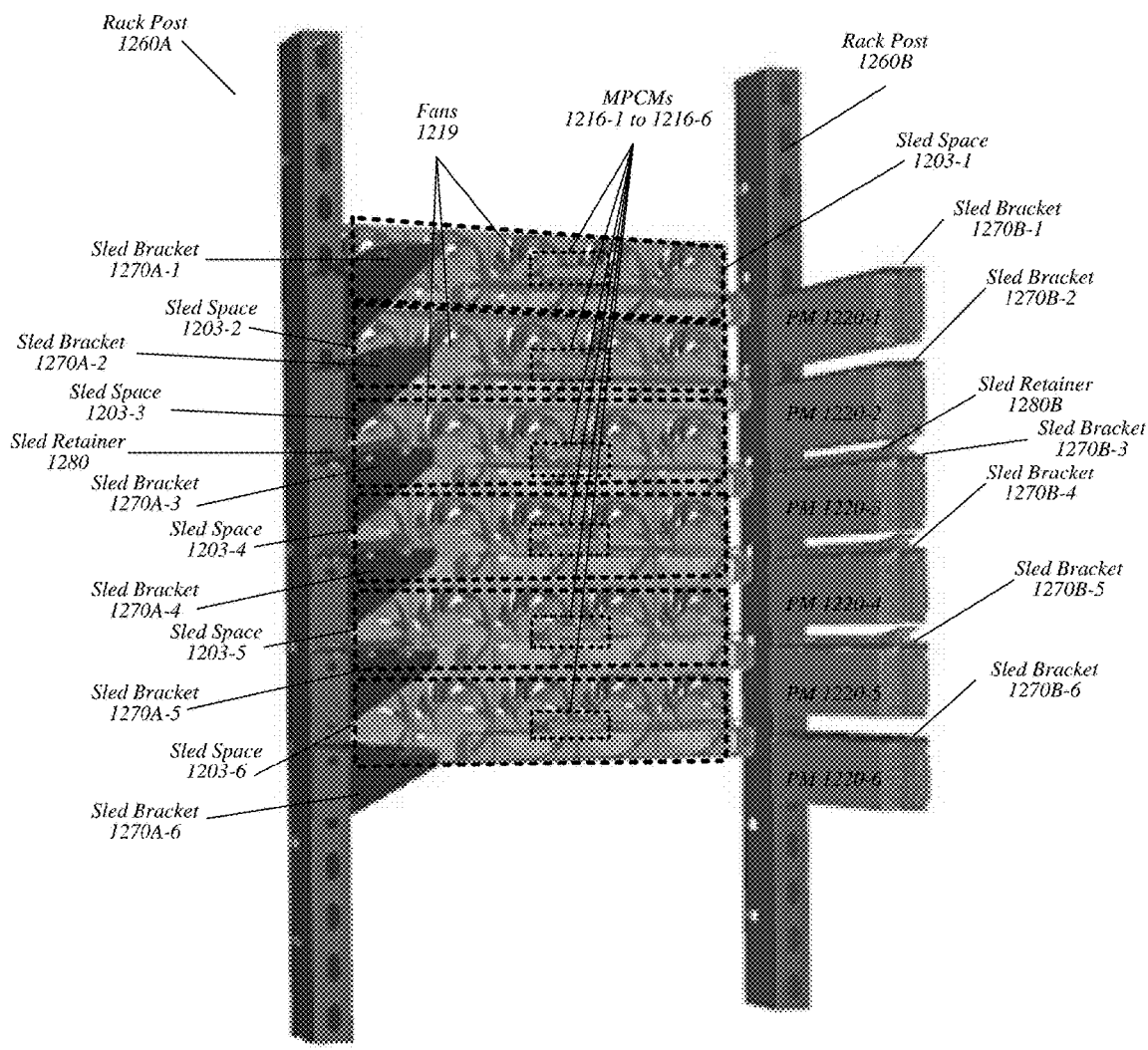

Turning more specifically to FIG. 12A, rack 1202 is depicted featuring six sled spaces 1203-1 to 1203-6. It is noted, that the number of sled spaces is depicted at a quantity to facilitate understanding and not to be limiting. Thus, rack 1202 could be implemented with any number of sled spaces.

Rack 1202 includes a pair of posts 1260A and 1260B. Posts 1260A and 1260B are arranged at rear corners of rack 1202 as depicted. Posts 1260A and 1260B can be envisioned or described as forming corners in a rear plane of the rack 1202. In some examples, the posts 1260A and 1260B are hollow. In some examples, the posts 1260A and 1260B are identical. Rack 1202 further includes a number of pairs of sled brackets 1270A and 1270B. In general, rack 1202 can also feature a pair of sled brackets for each sled space provided by rack 1202. Accordingly, in this illustrative example, rack 1202 comprises pairs of sled brackets 1270A-1 and 1270B-1 to 1270A-6 and 1270B-6, corresponding to sled spaces 1203-1 to 1203-6 respectively.

It is important to note, rack 1202 could share a post (e.g., post 1260A, post 1260B, or the like) with one or more adjacent racks (e.g., such as adjacent racks 302 of FIG. 3, or the like). For example, post 1260A could be shared with another rack adjacent to rack 1202 of a first side; post 1260B could be shared with another rack adjacent to rack 1202 of a second side; or post 1260A could be shared with another rack adjacent to rack 1202 of the first side while post 1260B could be shared with another rack adjacent to rack 1202 of the second side. Examples are not limited in this context.

A bracket from each pair of sled brackets can be mechanically coupled to respective ones of the posts 1260A and 1260B. For example, sled brackets 1270A-1 to 1270A-6 are coupled to post 1260A while sled brackets 1270B-1 to 1270B-6 are coupled to post 1260B (refer to FIGS. 12D and 12E). Sled brackets can be envisioned or described as forming side planes of rack 1202. In some examples, the sled brackets from a pair of sled brackets can be identical to each other. For example, sled bracket 1270A-1 and 1270B-1 can be identical. In general, each pair of sled brackets 1270A-1 and 1270B-1 to 1270A-6 and 1270B-6 form a shelf in which sleds (e.g., refer to FIGS. 13A-13B and FIGS. 15A-15C) can be robotically installed. This is described in greater detail below.

In various embodiments, temperature control in rack 1202 may be implemented using an air cooling system. For example, rack 1202 may feature a plurality of fans 1219 that are generally arranged to provide air cooling within the various sled spaces 1203-1 to 1203-6. In some embodiments, the height of the sled space is greater than the conventional "1U" server height. In such embodiments, fans 1219 may generally comprise relatively slow, large diameter cooling fans as compared to fans used in conventional rack configurations. Running larger diameter cooling fans at lower speeds may increase fan lifetime relative to smaller diameter cooling fans running at higher speeds while still providing the same amount of cooling. The sleds are physically shallower than conventional rack dimensions. In particular, in some specific non-limiting examples, sled spaces 1203-1 to 1203-6 can be between 10 to 40 inches wide, 6 to 18 inches deep and 2 to 8 inches high. In a particular non-limiting example, sled spaces 1203-1 to 1203-6 can be 18 inches wide, 10 inches deep and 4 inches high. In a particularly illustrative example, the sled can be 18 inches wide, 10 inches deep, and 8 inches high.

It is noted, that the physical resources on sleds (e.g., refer to FIG. 15A and FIG. 18) can be arranged on each sled to reduce thermal shadowing (i.e., not arranged serially in the direction of air flow). As a result, the wider, shallower sleds allow for an increase in device performance since the devices can be operated at a higher thermal envelope (e.g., 250 W) due to improved cooling (i.e., no thermal shadowing, more space between devices, more room for larger heat sinks, etc.) enabled by rack architecture 1202.

MPCMs 1216-1 to 1216-6 may be configured to provide inserted sleds with access to power sourced by respective power modules 1220-1 to 1220-6, each of which may draw power from an external power source (refer to FIG. 9). In various embodiments, the external power source may deliver alternating current (AC) power to rack 1202, and power modules 1220-1 to 1220-6 may be configured to convert such AC power to direct current (DC) power to be sourced to inserted sleds. In some embodiments, for example, power modules 1220-1 to 1220-6 may be configured to convert 277-volt AC power into 12-volt DC power for provision to inserted sleds via respective MPCMs 1216-1 to 1216-6. The embodiments are not limited to this example.

MPCMs 1216-1 to 1216-6 may also be arranged to provide inserted sleds with optical signaling connectivity to a dual-mode optical switching infrastructure (e.g., refer to FIG. 9), which may be the same as—or similar to—dual-mode optical switching infrastructure 514 of FIG. 5. In various embodiments, optical connectors contained in MPCMs 1216-1 to 1216-6 may be designed to couple with counterpart optical connectors contained in MPCMs of inserted sleds to provide such sleds with optical signaling connectivity to dual-mode optical switching infrastructure via respective lengths of optical cabling (e.g., refer to FIGS. 16A-16B). In some embodiments, each such length of optical cabling may extend from its corresponding MPCM to an optical interconnect loom (e.g., refer to FIG. 12B) that is external to the sled spaces of rack 1202.

Furthermore, rack 1202 can feature pair(s) of sled retainers 1280 coupled to particular pairs of sled brackets 1270A and 1270B, respectively, and arranged to align and/or retain sleds within sled spaces 1203. For example, sled retainers 1280A and 1280B are depicted coupled to sled brackets 1270A-3 and 1270B-3 to 1270A-5 and 1270B-5, respectively. However, for purposes of clarity, only sled retainers 1280A and 1280B coupled to sled bracket pair 1270A-3 and 1270B-3 are specifically called out in this figure. In some examples, the sled retainers 1280A and 1280B in each pair of sled retainers can be identical.

Turning more particularly to FIG. 12B, a portion of rack 1202 is illustrated in greater detail. In particular, posts 1260A and 1260B are depicted without other components of racks (e.g., brackets, fans, etc.) to more clearly illustrate examples representative of a rack implemented according to some embodiments. As depicted in this figure, each rack post (e.g., posts 1260A and 1260B) can feature sled bracket mounts 1261. In general, sled bracket mounts 1261 are arranged and configured to mechanically couple with sled brackets 1270 (refer to FIG. 12D) to secure sled brackets to posts as depicted and described herein. In particular, sled bracket mounts 1261 can be arranged to mechanically couple to corresponding rack post mounts (refer to FIG. 12D) on sled brackets to secure sled brackets to posts 1260A and 1260B. In some examples, sled bracket mounts 1261 can be cut-outs (e.g., as depicted). In some examples, sled bracket mounts 1261 can be protrusions with features to mechanically couple to corresponding cut-outs in sled brackets.

Rack posts 1260A and 1260B can further feature a loom 1223 disposed in one or more posts. For example, this figure illustrates loom 1223 disposed within posts 1260B. It is noted, that loom 1223 can be positioned within posts 1260B, for example, within a hollow cavity, within a recess, or the like. This is more fully illustrated with respect to FIG. 12E. In some examples, loom 1223 can be like, optical interconnect loom 923 described with respect to FIG. 9. In various embodiments, an optical interconnect loom, such as loom 1223, may be arranged to pass through posts, or other types of load-bearing elements of rack 1202. For example, as depicted, loom 1223 passes through post 1260B.

Figure 12C:
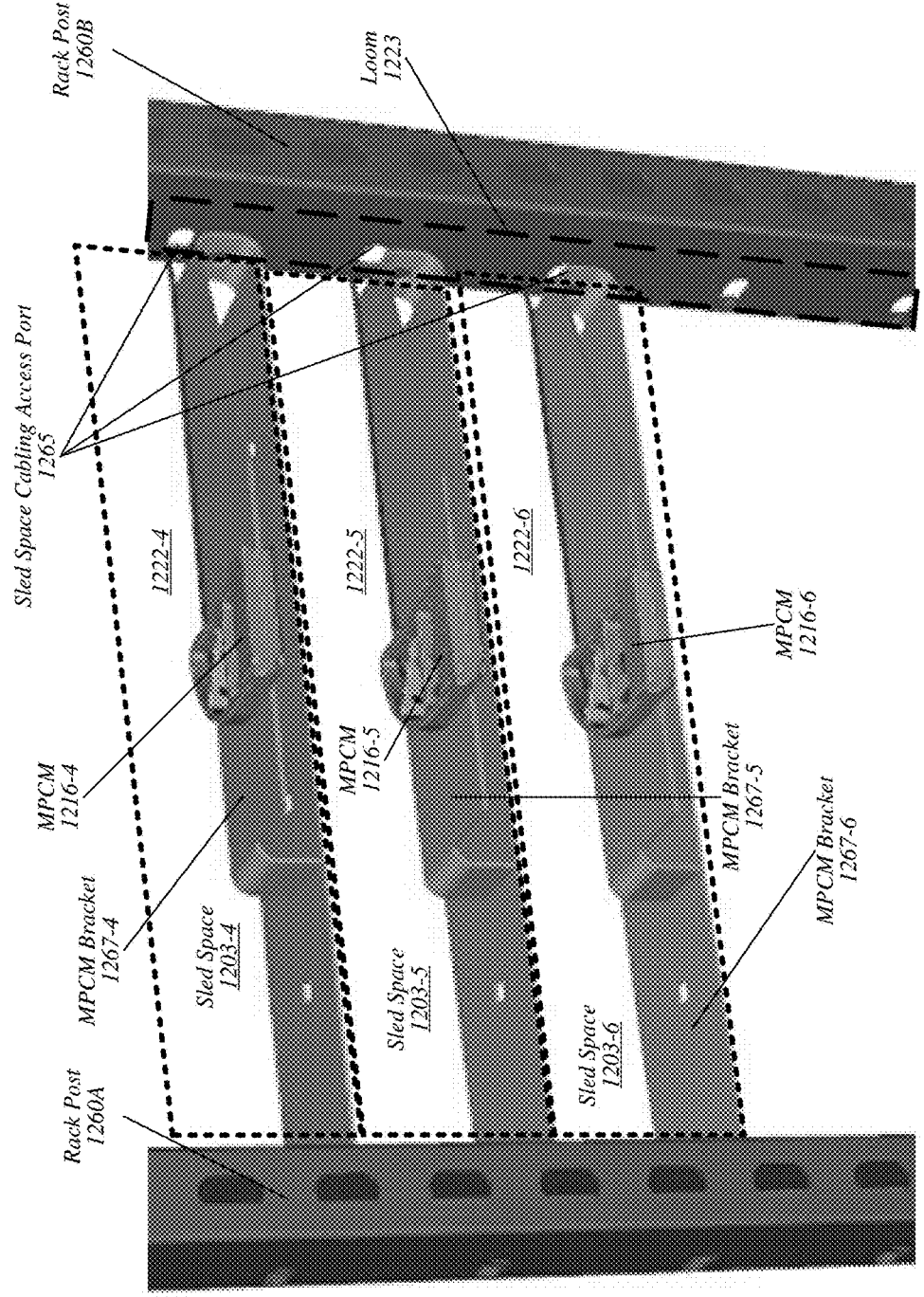

Rack posts 1260A and 1260B can further feature sled space cabling access ports 1265. In general, sled space cabling access ports 1265 can be arranged to provide optical interconnect, conventional copper interconnect, and/or electrical power cabling to individual sled spaces. 1203-1 to 1203-6. For example, port 1265 can provide access for cabling in a sled space to couple an MPCM to interconnect cabling in loom 1223. Turning more particularly to FIG. 12C a portion of rack 1202 is illustrated in greater detail. In particular, posts 1260A and 1260B are depicted without other components of racks (e.g., brackets, fans, etc.) to more clearly illustrate examples representative of a rack implemented according to some embodiments. In particular, this figure depicts optical interconnect cabling 1222 extending between loom 1223 disposed within post 1260B of rack 1202 and MPCMs 1216.

More particularly, this figure illustrates a few of sled spaces 1203 for purposes of clarity. Specifically, sled spaces 1203-4 to 1203-6 are depicted. Rack 1202 can feature MPCM brackets 1267 for each sled space. In general, MPCM brackets 1267 can supports individual MPCMs within a sled space. For example, MPCM brackets 1267-4 to 1267-6 are depicted supporting respective ones of MPCMs 1216-4 to 1216-6 within sled spaces 1203-4 to 1203-6.

Furthermore, optical cabling 1222 is depicted running between loom 1223 within post 1260B and MPCMs 1216, via cable access ports 1265. In general, each such length of optical cabling 1222 may extend from its corresponding MPCM to a loom 1223 that is external to the sled spaces of rack 1202. For example, optical cabling 1222-4 to 1222-6 is depicted running between loom 1223 and respective MPCMs 1216-4 to 1216-6, via respective cable access ports 1265.

Figure 12D:
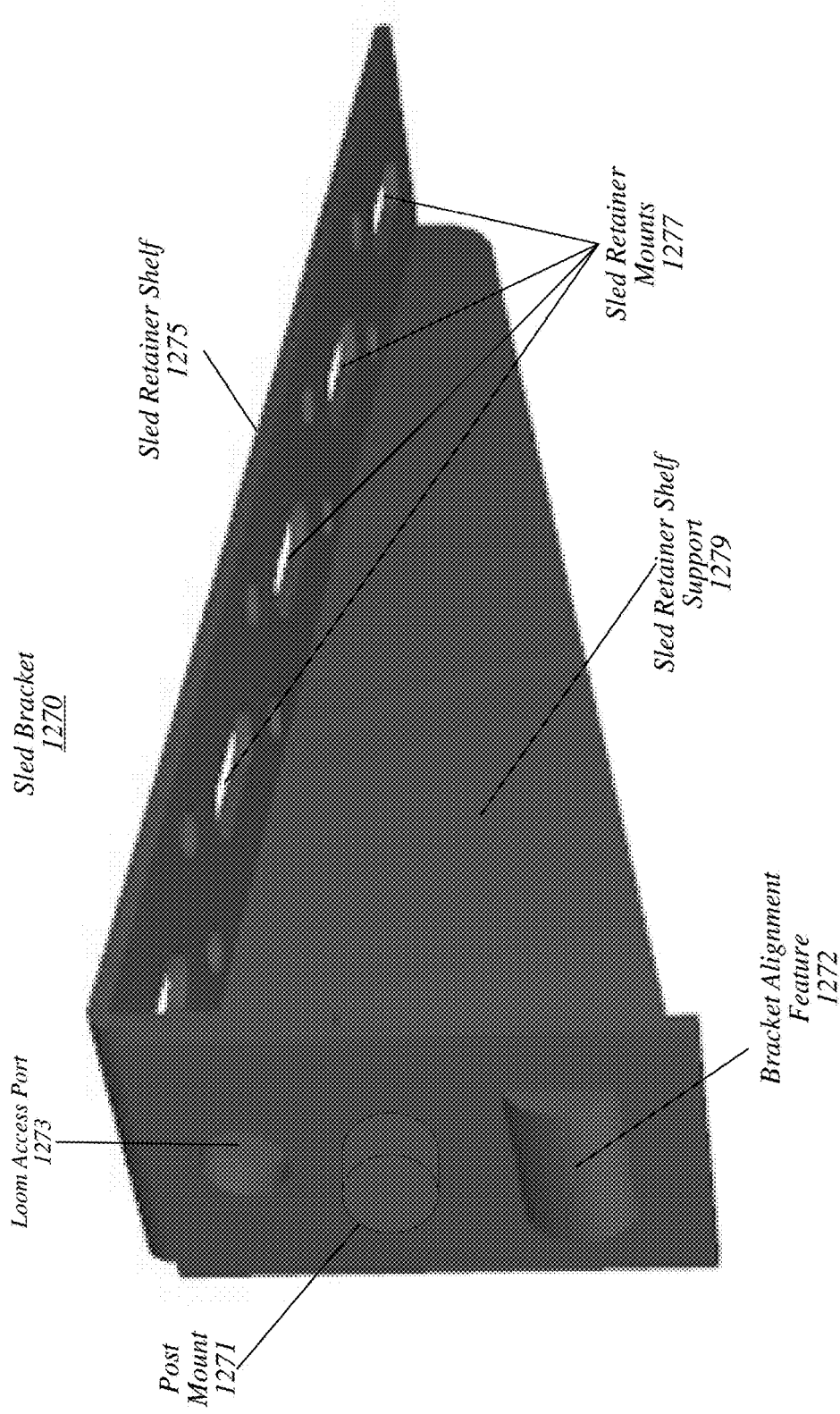

FIG. 12D illustrates a portion of rack 1202 in greater detail. In particular, a sled bracket 1270 is depicted without other rack components (e.g., posts, brackets, fans, etc.) to more clearly illustrate examples representative of a rack implemented according to some embodiments. The depicted sled bracket 1270 of rack 1202 can correspond to any of sled brackets 1270 depicted in FIGS. 12A-12C and 12E, such as, for example, one of sled brackets 1270A-1 to 1270A-6 or sled brackets 1270B-2 to 1270B-6. As depicted in this illustrative figure, sled bracket 1270 can include a post mount 1271 and bracket alignment feature 1272.

In general, post mount 1271 is arranged and configured to mechanically couple with rack posts (e.g., post 1260A, 1260B, or the like) to secure sled bracket 1270 to a posts of rack 1202 as depicted and described herein. In particular, post mount 1271 can be arranged to mechanically couple to a corresponding sled bracket mount 1261 (e.g., refer to FIG. 12B) on a post to secure sled bracket 1270 to the post. In some examples, post mount 1271 can be a protrusion with features to mechanically couple to corresponding cut-outs in posts (e.g., as depicted). In some examples, post mount 1271 can be cut-outs arranged to mechanically couple to a protrusion of a post. In some examples, sled bracket 1270 can feature more than one post mount 1271.

In general, bracket alignment feature 1272 can be any feature (e.g., protrusion, detent, cut-out, recess, bulge, or the like) arranged to mechanically couple to a feature of post (e.g., sled bracket mount 1261, or the like) and align sled bracket 1270 into an intended positon on rack 1202.

Sled bracket 1270 can further feature a loom access port 1273. Loom access port 1273 can be included in rack 1202 to provide a pathway for cabling (e.g., electrical power cabling, or the like) from loom 1263 (e.g., refer to FIGS. 12B-12C) through post 1260 and sled bracket 1270. Sled bracket 1270 can further feature a sled retainer shelf 1275. In particular, rack 1202 can include components and/or features (e.g., refer to FIGS. 13A-13B, FIGS. 15A-15C, and FIG. 17) to align and/or retain sleds in sled spaces or rack 1202. Such sled retainer components are described in greater detail below. However, in general, they can be arranged to provide alignment to a sled as a sled is inserted into a sled space. A sled retainer component can be mounted to each sled bracket, and in particular to sled retainer shelfs 1275 of each sled bracket 1270.

Sled bracket 1270 can further feature sled retainer mounts 1277. In general, sled retainer mounts 1277 can be features (e.g., cut-outs, structures, or the like) of sled retainer shelf 1275 that are arranged to mechanically couple to sled retainers 1280A and 1280B. For example, sled retainers (refer to FIGS. 13A-13B) can feature sled shelf mounts arranged to couple to sled retainer mounts of a sled bracket 1270 to mechanically secure a sled retainer to a sled shelf.

Figure 12E:
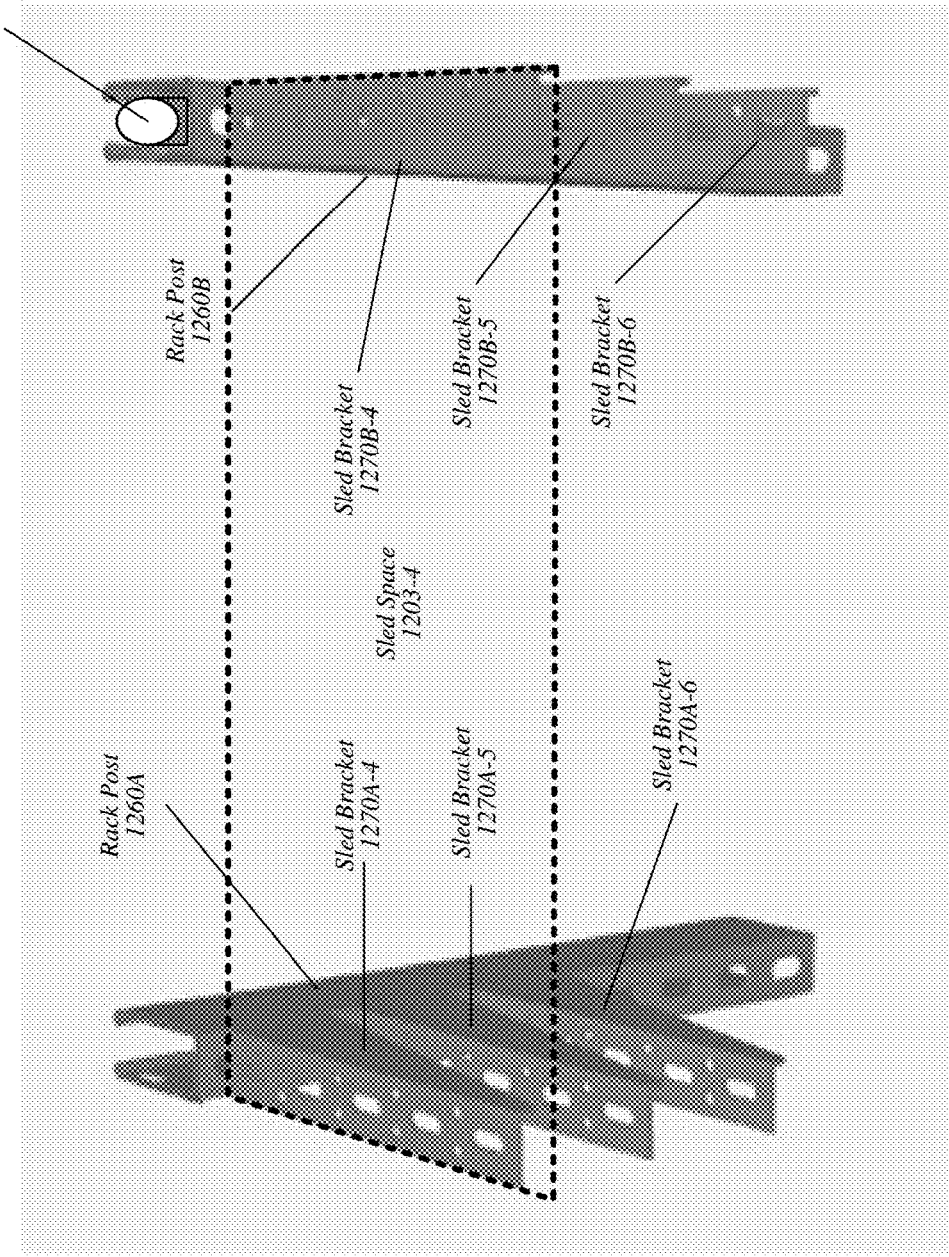

FIG. 12E illustrates a portion of rack 1202 in greater detail. In particular, a cut-away overhead view of posts and brackets without other components of racks (e.g., fans, MPCMs, etc.) is depicted to more clearly illustrate examples representative of a rack implemented according to some embodiments. In particular, a lower portion of rack 1202 is depicted including portions of posts 1260A and 1260B as well as sled brackets 1270A-4 to 1270A-6 and 1270B-4 to 1270B-6 corresponding to pairs of sled brackets defining sled spaces 1203-4 to 1203-6. For example, sled space 1203-4 is highlighted and specifically called out in this figure. Additionally, loom 1223 is depicted within post 1260B.

Figure 13B:
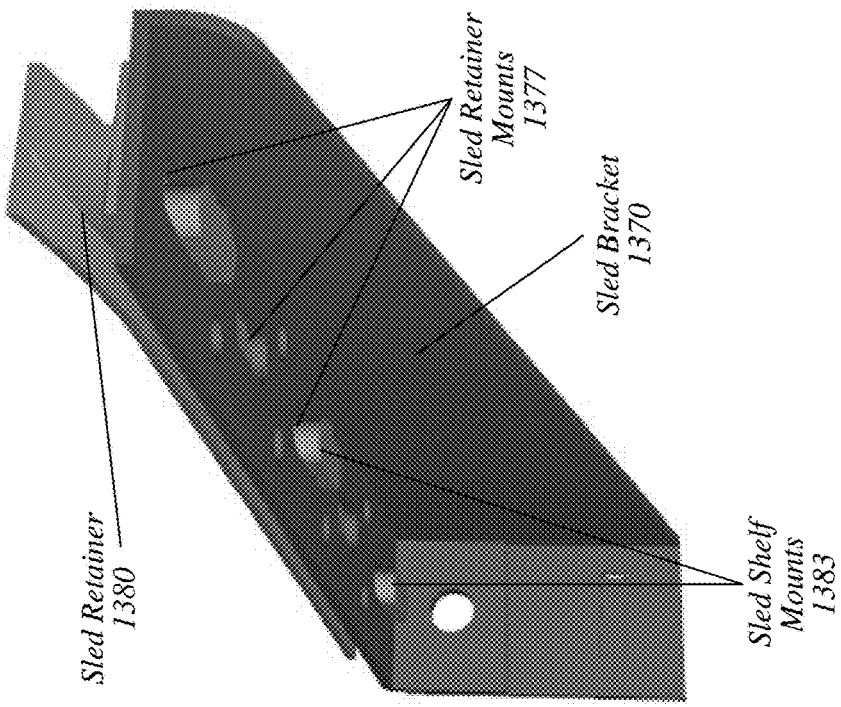
FIGS. 13A-13B illustrate example portions of a rack.
Figure 13A:
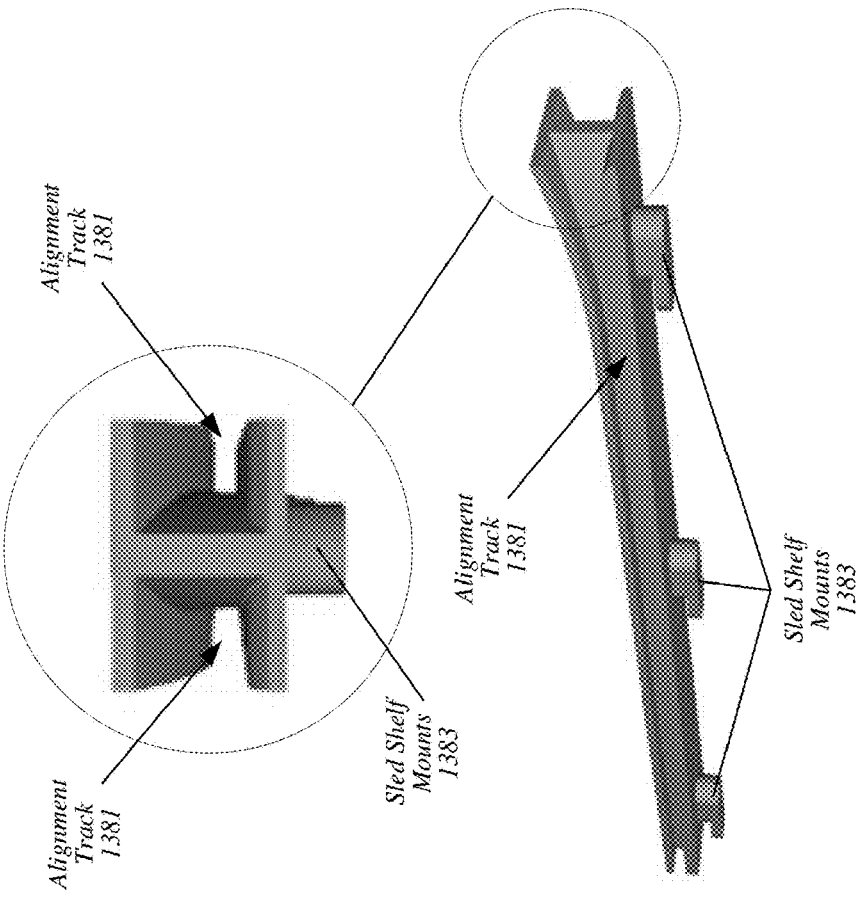

FIG. 13A illustrates a perspective view of an example sled retainer 1380 according to some embodiments. In some examples sled retainer 1380 can be representative of any of sled retainers 1280 depicted in FIG. 12A. As depicted, sled retainer 1380 can feature alignment tracks 1381. In general, alignment tracks 1381 can be arranged to accept portions (e.g., edge portion, substrate, corresponding alignment strips, or the like) of a sled to be inserted into a sled space to which sled retainer 1380 is associated. Additionally, with some examples sled retainer 1380 can include additional physical features (not shown), such as, for example, recesses, protrusions, detents, or the like within alignment tracks 1381. Such features can be arranged to retain a sled within alignment track 1381 once seated (e.g., by a robot, or the like). For example, alignment tracks 1381 can feature a lip (not shown) formed at the entrance to the alignment track to retain a sled manipulated into the alignment track. Furthermore, in some examples, sled retainer can be arranged to facilitate automated and/or robotic installation and alignment of a sled within a sled space. For example, as depicted, the entrance or frontal portion is wider to ease insertion of a sled into alignment tracks and then "guide" the sled into a desired position within a sled space.

Sled retainer 1380 can be arranged to couple to a sled bracket. FIG. 13B illustrates the sled retainer coupled to an example sled bracket 1370 according to some embodiments. Sled bracket 1370 can be representative of sled brackets 1270 depicted in FIG. 12A and FIGS. 12D-12E. As depicted, sled retainer 1380 is coupled to sled bracket 1370. In particular, sled shelf mounts 1383 couple with sled retainer mounts 1377. Said differently, sled shelf mounts 1383 insert into sled retainer mounts 1377 to mechanically couple and secure sled retainer 1380 to sled bracket 1370.

Figure 14:
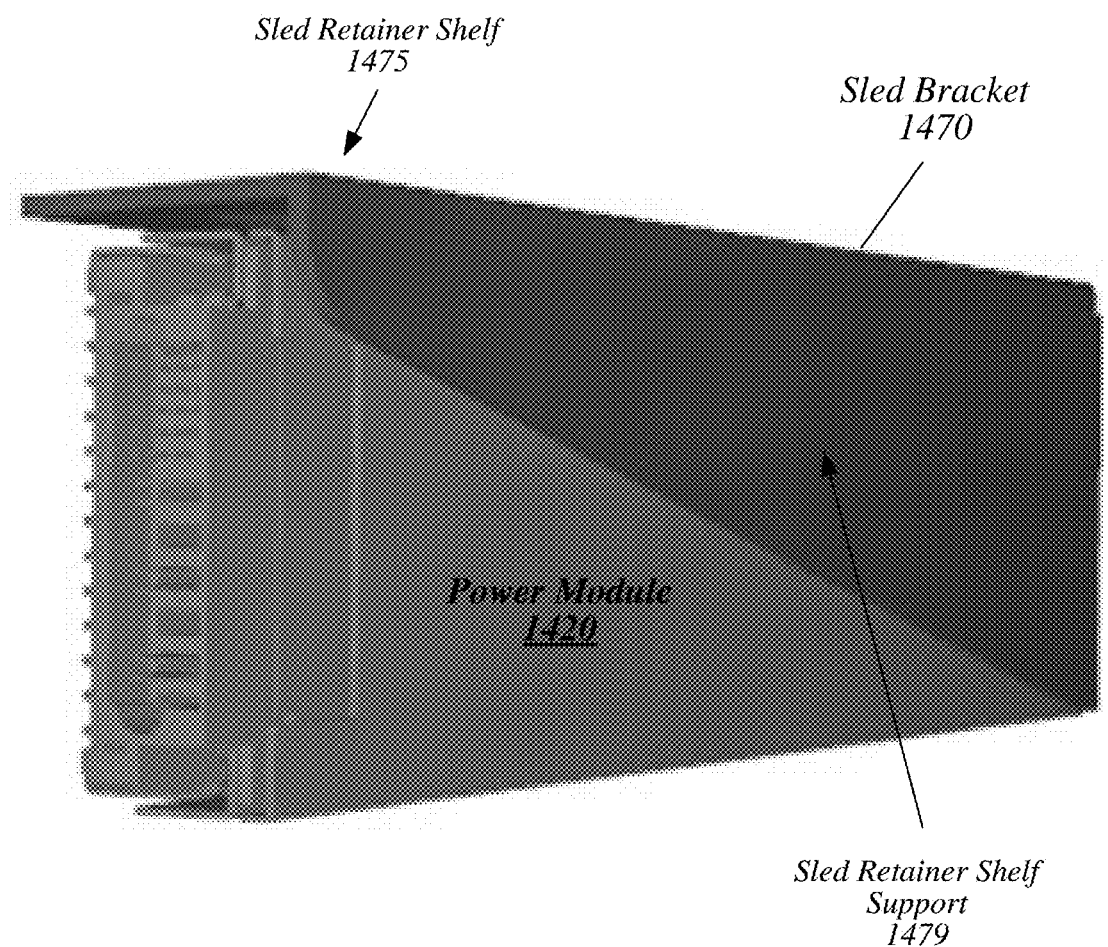
FIG. 14 illustrates an example of portions of a rack.

FIG. 14 illustrates an example power module coupled to a sled bracket according to some embodiments. In general, a power module can be provided for each sled space (refer to FIGS. 9 and 12A). Power module 1420 can be representative of any one of these power modules (e.g., power module 920-1 to 920-7, power module 1220-1 to 1220-6, or the like). As detailed above, power module 1420 can be configured to convert AC power (e.g., from an external power source) to direct current (DC) power to be sourced to sleds inserted into a sled space to which the power module 1420 is associated. In some embodiments, power module 1420 may be configured to convert 277-volt AC power into 12-volt DC power for provision to inserted sleds via a respective MPCM.

In some examples, power module 1420 can be coupled to a sled bracket 1470 of a rack, for example, as depicted in this figure. In some embodiments, power module 1420 can be arranged to be disposed within a space formed by a sled retainer shelf 1475 and sled retainer shelf support 1479 of sled bracket 1470.

Figure 15A:
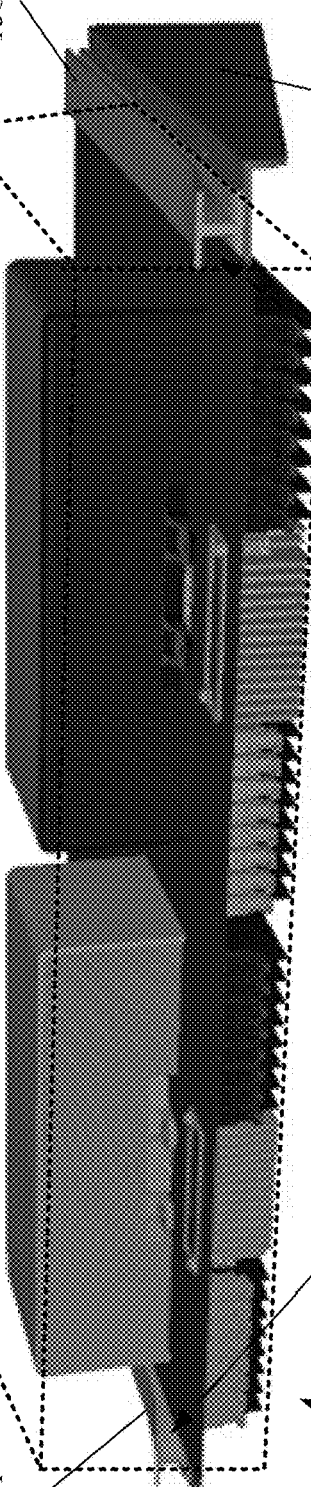
FIGS. 15A-15C illustrate example portions of a rack.
Figure 15C:
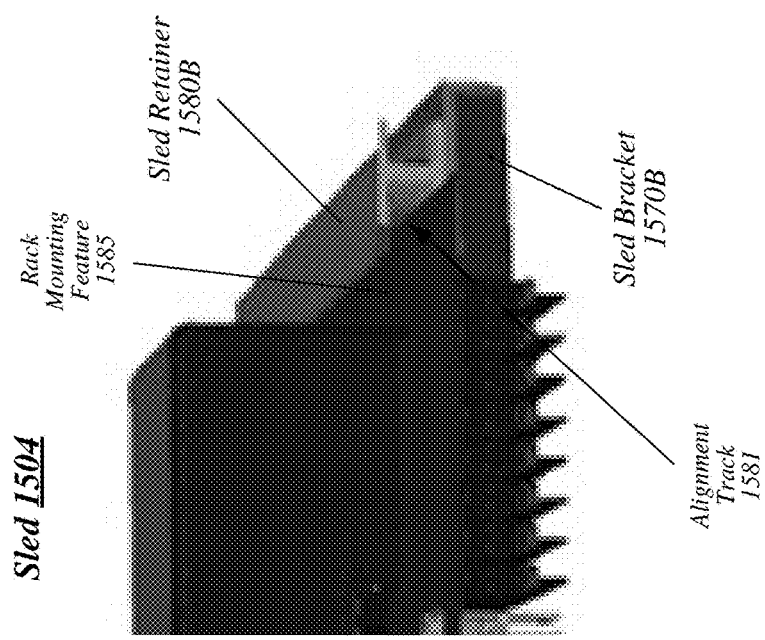
Figure 15B:
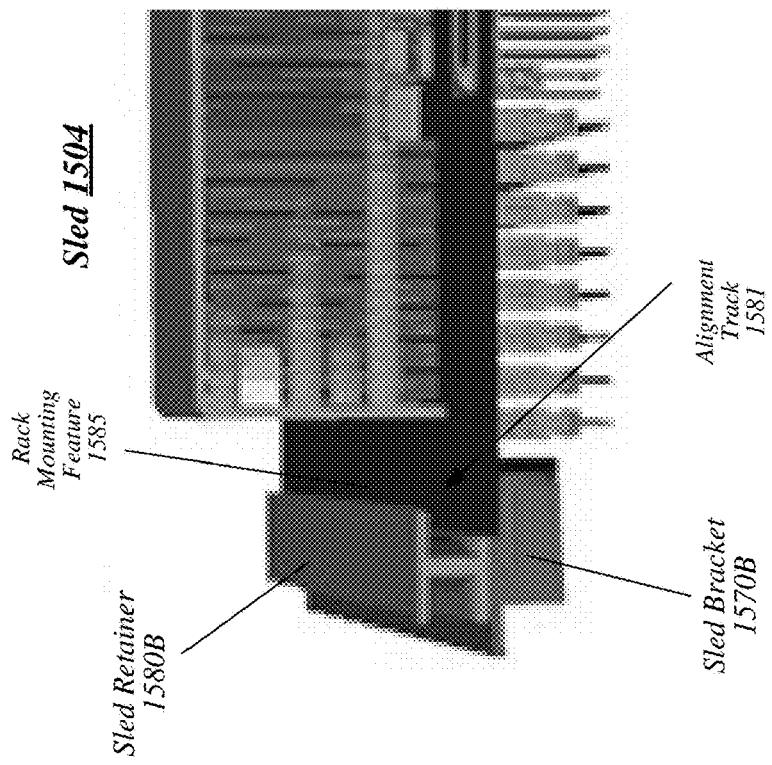

FIGS. 15A-15C illustrate perspective views of a sled 1504 that may be representative of a sled implemented according to some embodiments inserted into a particular sled space of a rack. In particular, these figures depict a sled coupled to sled retainers supported by sled brackets of a rack to align sled 1504 into a particular sled space. Sled 1504 and sled space 1503 can be implemented in a data center detailed herein. For example, sled 1504 and sled space 1503 can correspond to a sled inserted into a sled space 903 of rack 902. Examples are not limited in these contexts.

As depicted in this illustrative figure, sled 1504 includes rack mounting features 1585, which are arranged to couple to alignment tracks 1581 of sled retainers 1580A and 1580B, which themselves are coupled to sled brackets 1570A and 1570B, respectively. Sled brackets 1570A and 1570B can in turn be coupled to a rack, and specifically, rack posts (refer to FIGS. 12A-12D), thus, forming sled space 1504 within a rack.

In some examples, lateral ends, or sides, of a sled can include rack mounting features. For example, FIGS. 15B and 15C depict rack mounting features 1585 formed from respective sides of sled 1504. These rack mounting features 1585 can be arranged to couple to corresponding alignment tracks 1581 in sled retainers 1580A and 1580B, respectively.

Additionally, with some examples rack mounting features 1585 can include various detainment features (not shown), such as, for example, recesses, protrusions, detents, or the like. Such detainment features can be arranged to retain sled 1504 within alignment tracks 1581 once seated (e.g., by a robot, or the like). For example, rack mounting features 1585 can include a recess (not shown) formed along a portion of rack mounting feature 1585 and configured to couple to a protrusion of alignment track 1581.

Figure 16A:
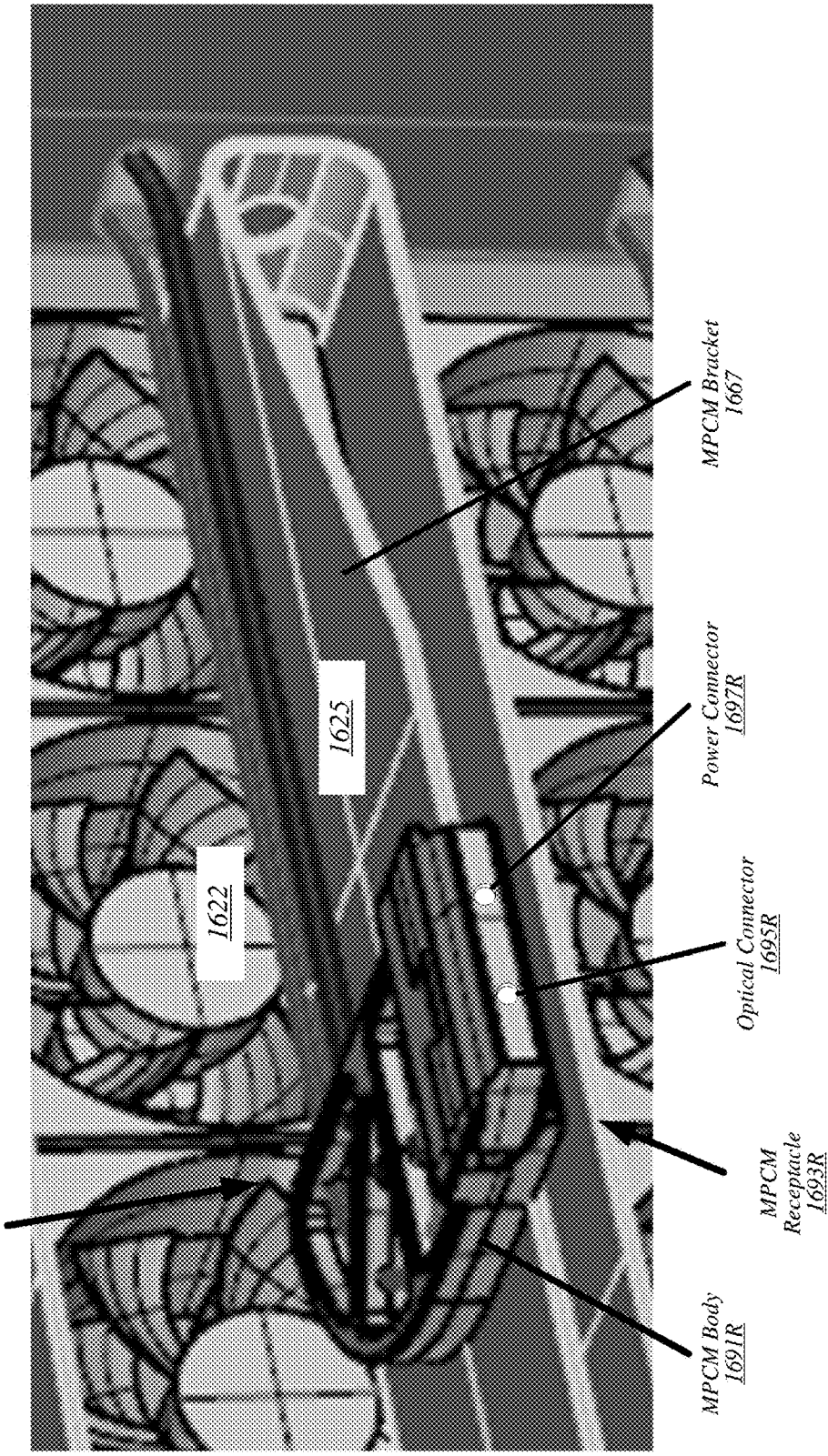
FIGS. 16A-16B illustrate example portions of a rack.
Figure 16B:
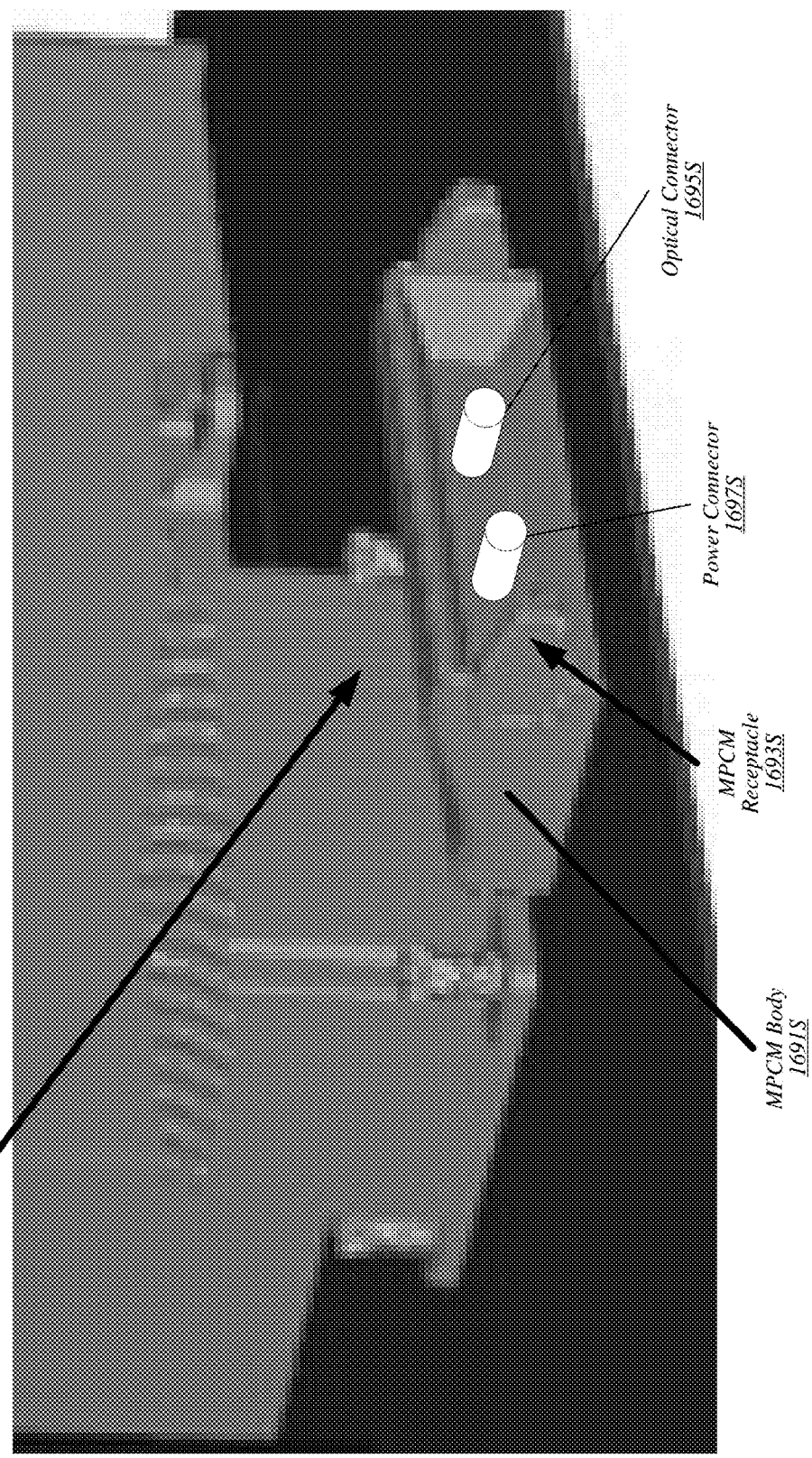

FIGS. 16A-16B illustrate perspective views of an example MPCM arranged according to some embodiments. In particular, FIG. 16A depicts an illustrative rack side MPCM while FIG. 16B depicts an illustrative sled side MPCM. It is noted, that the arrangement of the rack side MPCM and sled side MPCM is given for illustration purposes only and not to be limiting. For example, an implementation could be envisioned where the features of rack side MPCM are implemented on the sled side MPCM, and vice versa.

Turning more particularly to FIG. 16A, a portion of a sled space area including rack side MPCM 1616R mounted to an MPCM bracket 1667 is depicted. In some examples, the sled space area depicted can correspond to any of the sled spaces detailed herein, such as, for example, sled spaces 903-1 to 903-7 of FIG. 9. The rack side MPCM 1616R can include an MPCM body 1691R as well as connector components arranged to couple to corresponding connector components of a sled side MPCM (see FIG. 16B).

In particular, the MPCM 1616R features MPCM receptacle 1693R, optical connector 1695R and power connector 1697R. In some examples, the rack side MPCM connector 1616R can be envisioned as a generally female shaped connector. However, examples are not limited in this context and the rack side MPCM 1616R could be implemented as a male connector, or other type connector. The optical connector 1695R is coupled to optical cabling 1622 to couple MPCM 1616R to an optical fabric (e.g., via optical cabling in a loom of rack post, or the like). Power connector 1697R is coupled to electrical power cabling 1625 to couple MPCM 1616R to a power source (e.g., power module of the corresponding sled space, or the like).

Turning more particularly to FIG. 16B, a portion of a sled including sled side MPCM 1616S mounted to a substrate of a sled is depicted. In some examples, the portion of the sled can correspond to any sled detailed herein. The sled side MPCM 1616S can include an MPCM body 1691S as well as connector components arranged to couple to corresponding connector components of a rack side MPCM (see FIG. 16A).

In particular, the MPCM 1616S features MPCM receptacle 1693S, optical connector 1695S and power connector 1697S. In some examples, the sled side MPCM connector can be envisioned as a generally male shaped connector. However, examples are not limited in this context and the sled side MPCM 1616S could be implemented as a female connector, or other type connector.

Figure 17:
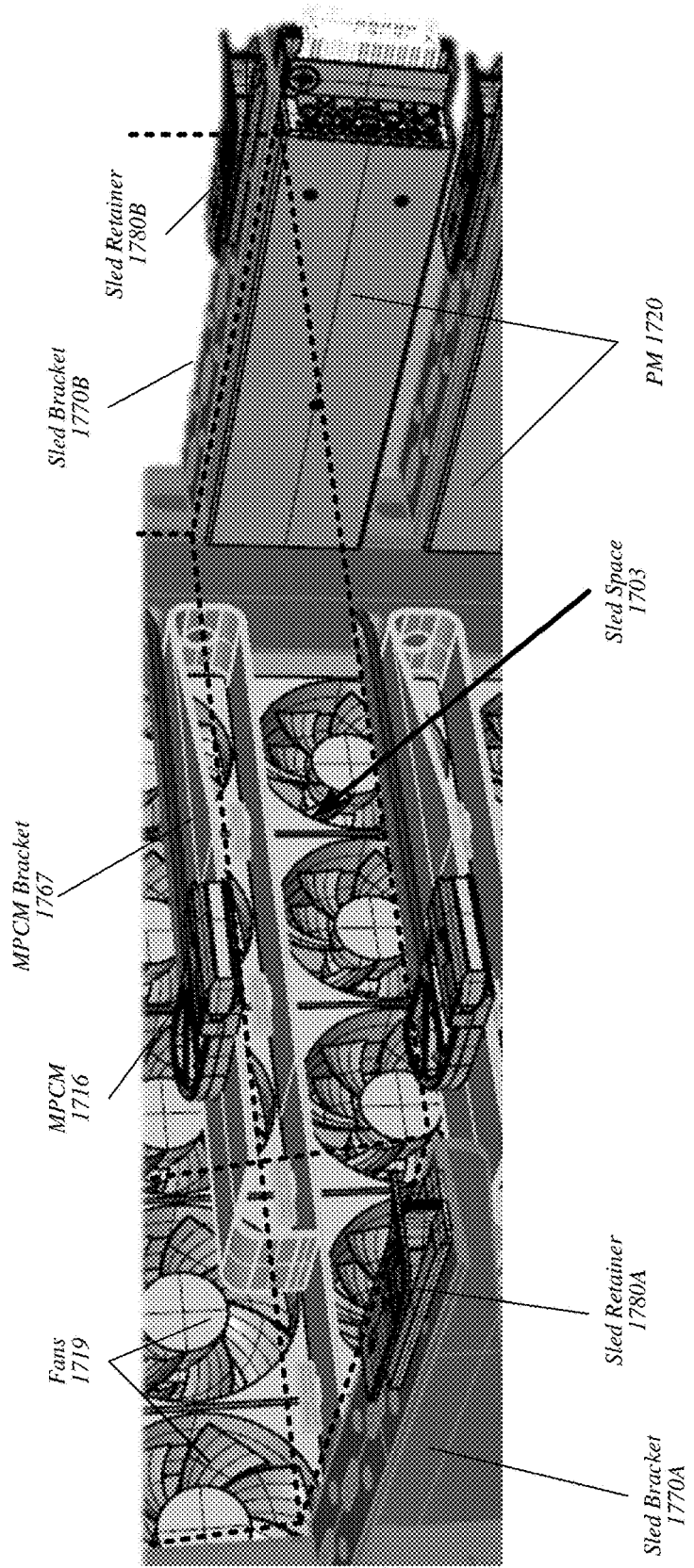
FIG. 17 illustrates example portions of a rack.

FIG. 17 illustrates a perspective view of a rack 1702 that may be representative of a rack implemented according to some embodiments. In general, the rack 1702 may be similar to the rack 1202 of FIGS. 12A-12E. In the illustrative example depicted in FIG. 17, the rack 1702 features a sled space 1703 formed from a pair of sled brackets 1770A and 1770B. Sled retainers 1780A and 1780B are coupled to respective sled brackets 1770A and 1770B. Rack 1702 additionally, features an MPCM 1716 coupled to an MPCM bracket 1767 to position MPCM 1716 within sled space 1703. MPCM 1716 can be arranged to couple to a corresponding MPCM of a sled inserted into sled space 1703. Rack 1702 can feature fans 1719 arranged to cool components of a sled inserted into sled space 1703. Furthermore, rack 1702 can feature power modules 1720 corresponding to each sled space of the rack 1702. Power modules 1720 can be arranged to provide power to component(s) of a sled inserted into a sled space corresponding to the power module 1720.

Figure 18:
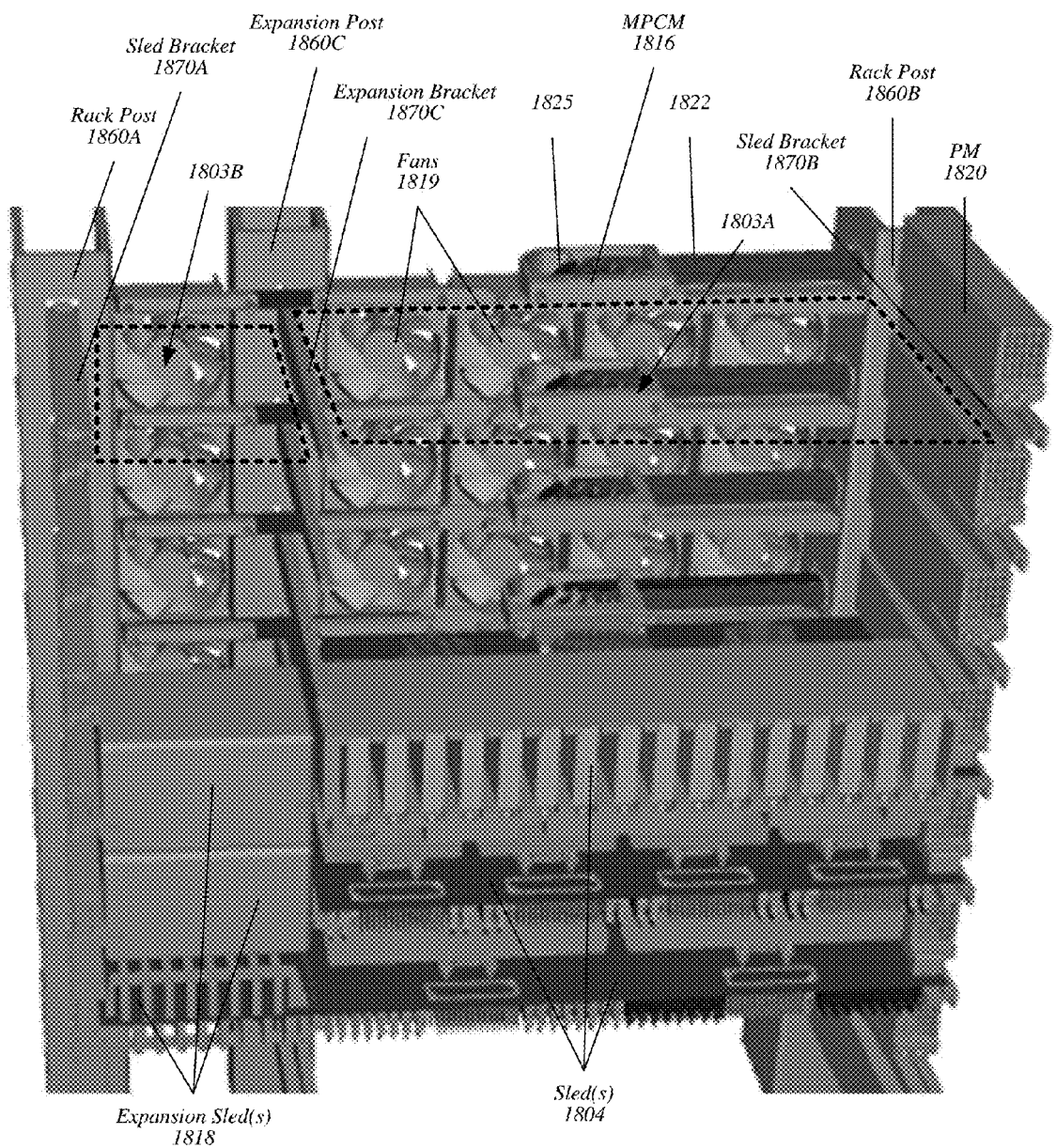
FIG. 18 illustrates a sixth example rack.

FIG. 18 illustrates a perspective view of a rack 1802 that may be representative of a rack implemented according to some embodiments that feature an expansion region. For example, the rack 1802 may be similar to the rack 902 of FIG. 9. Furthermore, rack 1802 can feature similar components to racks 1202 and 1702 described with reference to FIGS. 12A-12E and FIG. 17. In the illustrative example depicted in FIG. 18, the rack 1802 features a number of sled spaces (not called out for clarity purposes, however, refer to FIG. 9 for sled space arrangement) formed from a pair of sled brackets 1870A and 1870B. Sled brackets 1870A and 1870B are coupled to rack posts 1860A and 1860B, respectively. Furthermore, rack 1802 can feature an expansion post 1860C disposed between rack posts 1860A and 1860B to divide a sled space into a primary region 1803A and an expansion region 1803B.

Rack 1802 additionally features MPCMs 1816 arranged to couple to a corresponding MPCM of a sled inserted into primary sled space 1803A. Rack 1802 further features expansion brackets 1870C coupled to expansion post 1860C. Expansion brackets can be arranged to couple to sleds and/or expansion sleds inserted into corresponding primary and expansion sled spaces 1803A and 1803B.

Rack 1802 can feature fans 1819 arranged to cool components of a sled inserted into primary and expansion sled spaces 1803A and 1803B. Furthermore, rack 1802 can feature power modules 1820 corresponding to each sled space of the rack 1802. Power modules 1820 can be arranged to provide power to component of a sled inserted into a sled space corresponding to the power module 1820.

Furthermore, this illustrative figure depicts some example primary and expansion sleds inserted into various sled spaces of rack 1802. In particular, primary sleds 1804 are depicted inserted into a number of primary sled spaces 1803A while expansion sleds 1818 are depicted inserted into a number of expansion sled spaces 1803B.

Figure 19:
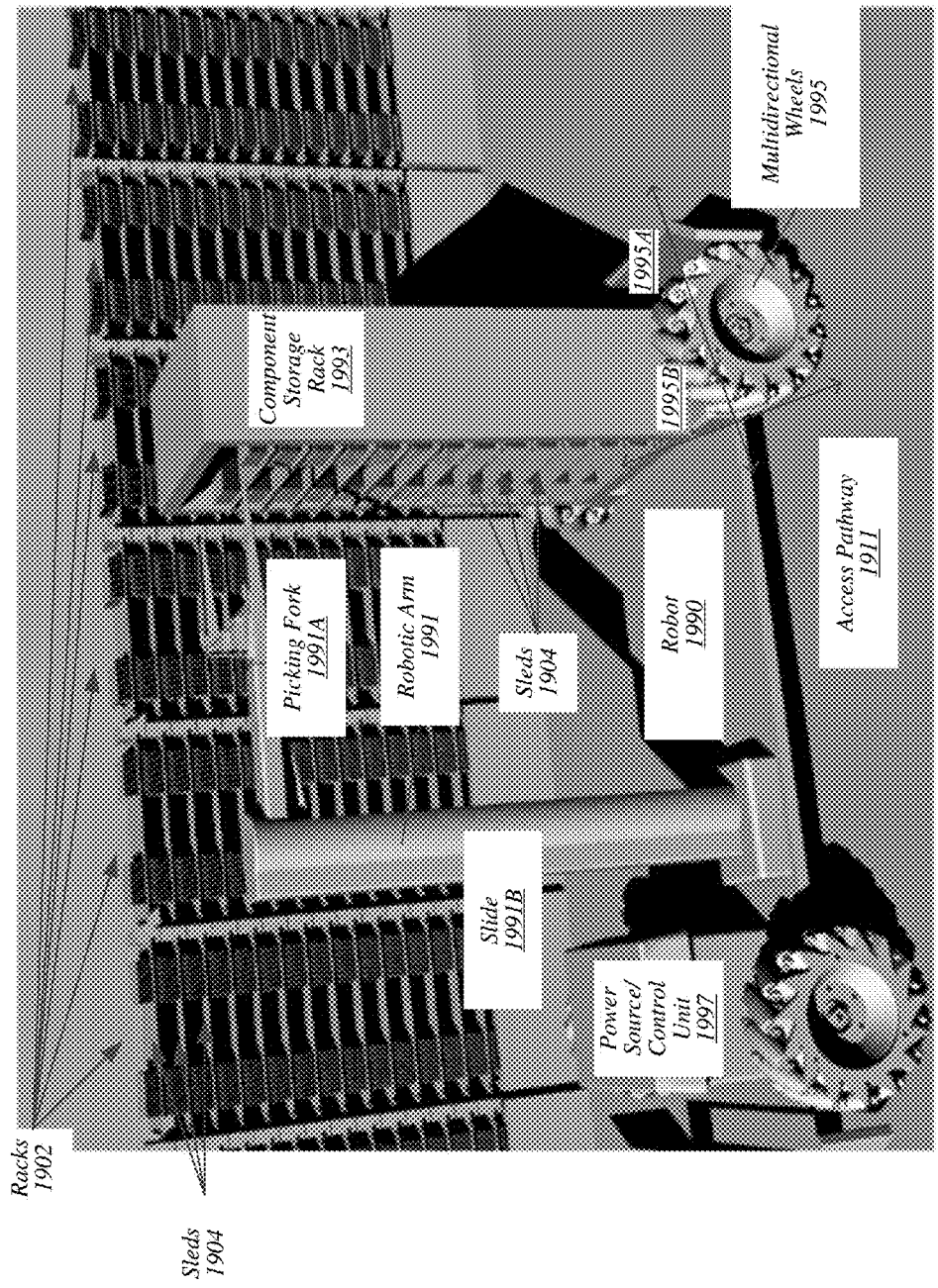
FIG. 19 illustrates a fifth example data center.

FIG. 19 illustrates an example data center 1900 in which a robot 1990 can operate to install, replace, and/or maintain the data center. In particular, data center 1900 includes rows of racks 1902, which each feature a number of sleds 1904 installed into sled spaces of the racks 1902. It is noted, that the racks 1902 and sleds 1904 depicted herein can be implemented according to some embodiments, such as, for example, any of the racks and/or sleds detailed and depicted herein. In particular, the racks 1902 and sled 1904 can be arranged and configured to mechanically couple as detailed herein. For example, racks 1902 can feature brackets and retainers (refer to as least FIGS. 12A-12E) while sleds 1904 can include mounting features (refer to as least FIGS. 15A-15C) to facilitate automated, or autonomous, installation and/or removal of sleds 1904 from racks 1902 by robot 1990.

Furthermore, in some examples, individual components of a sled can be replaceable and/or maintainable by robot 1990. For example, some sleds 1904 could comprise physical storage resources (e.g., SSDs, or the like) and robot 1990 can be arranged to install and remove SSDs from any number of such sleds 1904. Examples are not limited in this context.

Robot 1990 can be configured (e.g., dimensioned, sized, or the like) to travel along access pathway 1911 to access racks 1902, and particularly sleds 1904, within data center 1900. Robot 1990 can feature multi-directional wheels 1995 arranged to facilitate movement and/or travel of the robot in a number of directions. It is noted, that the robot 1990 is depicted including 4 multi-directional wheels 1995. However, examples can be envisioned where the robot 1990 is implemented with more or less than 4 multi-directional wheels. For example, robot could be implemented with 6 multi-directional wheels, or 3 multi-directional wheels. Furthermore, as used herein, multi-directional wheels 1995 can be configured to rotate along more than one axis. Said differently, multi-directional wheels 1995 are configured to propel the robot over more than one axis. For example, as depicted in this figure, the multi-directional wheels 1995 are configured to propel the robot along a first axis 1995A and a second axis 1995B. In this illustration, the first and the second axis are orthogonal to each other. Furthermore, although not shown, the multi-directional wheels 1995 can feature actuators, motors, pumps, screws, or the like, which are arranged to move the components of multi-directional wheels 1995 and propel the robot 1990 about the axes 1995A and/or 1995B. Examples are not limited in this context.

In some examples, the robot 1990 can be controlled remotely by an operator, for example, a human operator. In some examples, the robot 1990 can be programmed to operate autonomously and/or partially autonomously. This is described in greater detail below, for example, with respect to FIGS. 20-22.

Robot 1990 can feature a robotic arm 1991 and a component storage rack 1993. In general, component storage rack 1993 can be arranged to house and/or store components for data center 1990, such as, for example, sleds 1904. In some examples, component storage rack 1993 can be arranged to house components of sleds 1904 (e.g., SSDs, or the like). Robotic arm 1991 can include features to enable moving sleds 1904 from component storage rack 1993 to individual racks 1902 and vice versa. For example, robotic arm 1991 can feature a picking fork 1991A arranged to manipulate a sled. The picking fork 1991A can be configured to telescope and/or articulate about an axis formed by slide 1991B. In an illustrative example, picking fork can be inserted under a sled 1904; raised to support a sled and remove the sled from component storage rack 1993; and insert the sled into a sled space of a rack 1902 in data center 1990. Furthermore, although not shown, robotic arm 1991 can include actuators, motors, pumps, screws, or the like, which are arranged to move the robotic arm 1991 about the axis (or axes) as described herein. For example, the robotic arm 1991 can be hydraulically actuated and could be configured with a hydraulic pump, reservoir, and piston, which are arranged to move the picking fork 1991A. As another example, the robotic arm 1991 can be mechanically actuated and could be configured with a screw, electric motor, and nut apparatus, which are arranged to move the picking fork 1991A.

Figure 20:
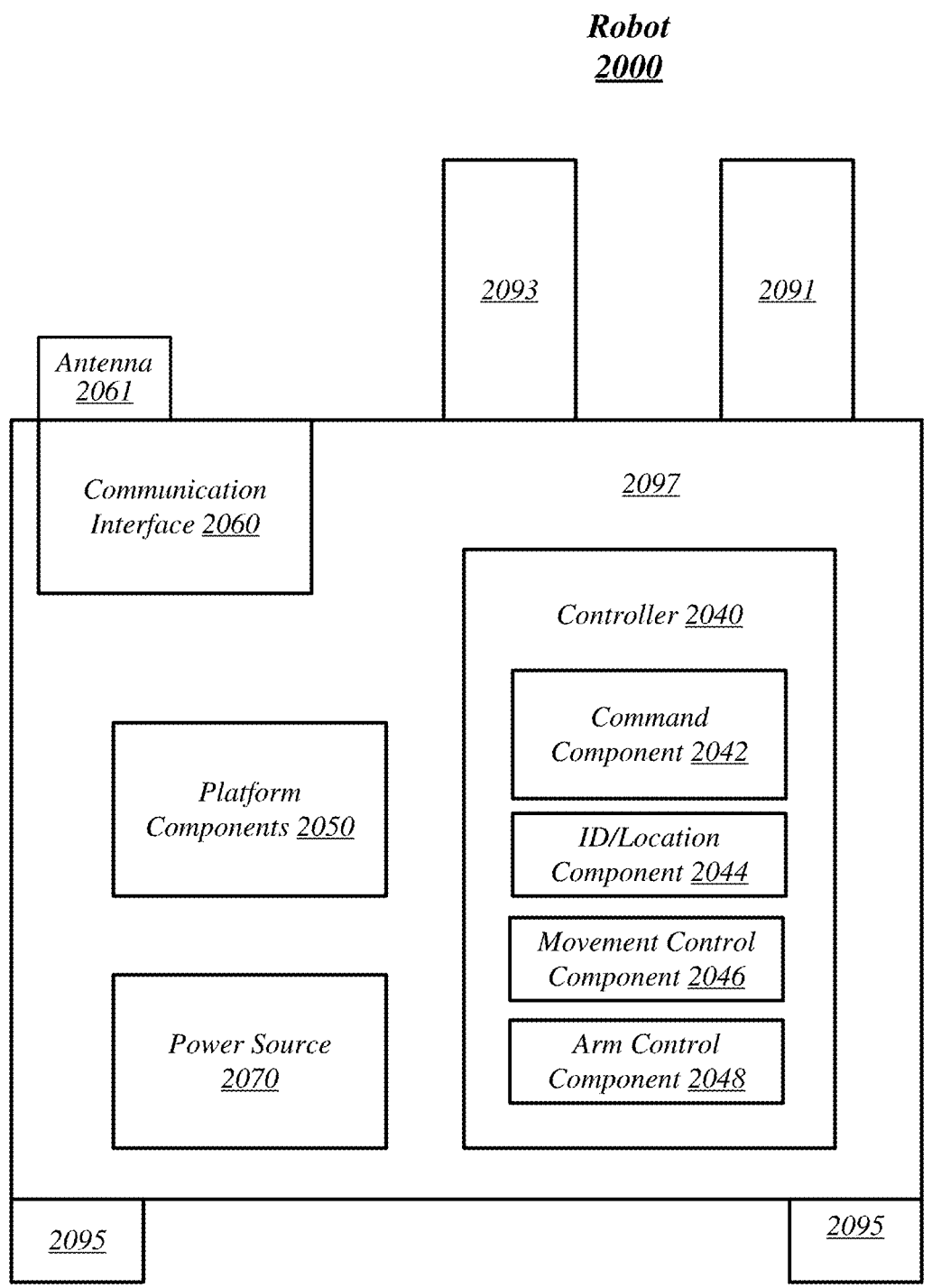
FIG. 20 illustrates an example robot for a data center.

Robot 1990 can feature a power source and control unit 1997. FIG. 20 illustrates a block diagram of an example robot 2000. In some examples, the robot 2000 can be implemented as the robot 1990 of FIG. 19. In the illustrative example depicted in FIG. 20, robot 2000 can feature power source/control unit 2097 including a controller 2040, platform components 2050, communications interface 2060 and antenna 2061, and power source 2070. Furthermore, robot 2000 can feature multi-directional wheels 2095 (e.g., like multi-directional wheels 1995), a robotic arm 2019 (e.g., like robotic arm 1991) and a component storage rack 2093 (e.g., like component storage rack 1993).

In general, power source 2070 can be any power source arranged to provide power to the system(s) and/or subsystem(s) of robot 2000. In some examples, the power source 2070 can be rechargeable. For example, the power source could be a lithium based rechargeable battery. In other examples, the power source can be a fuel cell, for example, the power source could be a propane or natural gas cylinder. Examples are not limited in this context.

Controller 2040 can be a processor component or a combination of processor component(s) and other circuitry, such as, for example, programmable logic components, or the like. In some examples, controller 2040 can comprise instructions to be executed by a processing component to cause the robot to operate as described. Controller 2040 can feature a number of components arranged to control operation of robot 2000, for example, to facilitate autonomous configuration, maintenance, installation, and/or removal of sleds and component from sleds within a data center.

The platform components 2050 can include any of a variety of components to facilitate interactions between the user and the robot, between the robot and an environment (e.g., a data center, racks, sleds, physical resources, or the like). For example, the platform components 2050 can include a camera, a scanner, a radar detector, a speaker, a display, input button(s), joystick(s), a keyboard, sensor(s).

In general, communications interface 2060 and antenna 2061 can be any of a variety of wireless interfaces to communicatively couple the robot to entities within a data center. For example, the communications interface 2060 and antenna 2061 could be arranged to communicatively couple to a physical infrastructure management framework. In particular, the communications interface 2060 and antenna 2061 could be arranged to communicatively couple to a pod manager of a physical infrastructure management framework, such as, framework 1150A of FIG. 11.

As another example, the communications interface 2060 and antenna 2061 could be arranged to communicatively couple to a rack, such as, for example, a rack having various beacons or sensors coupled to the rack. As a specific example, the communications interface 2060 and antenna 2061 could be arranged to communicatively couple to an RFID beacon and/or sensor coupled to a rack in the data center, a sled in the data center, or the like.

In some examples, communications interface 2060 and antenna 2061 can be arranged to couple via any of a variety of communications standards and technologies, such as, wireless standards (e.g., IEEE 802.11 standards), cellular standards (e.g., 1G, 3G, 4G, LTE, LTEA, 5G, or the like), peer-to-peer standards (e.g., Bluetooth, ZigBee, NFC, RFID, or the like).

In the illustrative example depicted in this figure, controller 2040 features a command component 2042, an ID/location component 2044, a movement control component 2046 and an arm control component 2048. In general, command component 2042 can be configured to determine an operation for robot 2042. For example, command component 2042 can receive an information element to include an indication of a command from a pod manager of a data center in which the robot 2000 is operating. Example commands could include, install a particular type of sled in a specified sled space, remove a particular sled from a specified sled space, replace a particular component from a specified sled, or the like. In some examples, the command components 2042 can receive information elements to include indications of various telemetry and/or operational metrics, statistics, data points, or the like related to the operation of physical resources within the data center. Command component 2042 can determine an operation for robot 2000, autonomously, for example, based on the received telemetry data.

ID/location component 2044 can be configured to determine a geo-location of the robot 2000 within a data center and also identify particular racks and sled spaces within the data center. For example, the ID/location component 2044 could couple to a global positioning unit sensor provided in platform components 2050 and determine a location of the robot within a data center. As another example, ID/location component 2044 could couple to communications interface 2060 and determine a location of the robot within a data center based, for example, on wireless network signal triangulating techniques. In another example, ID/location component 2044 can maintain, for example, in computer-readable memory, a map of a data center and can update a location of the robot 2000 based on the map as the robot travels throughout the data center. In some examples, ID/location component 2044 can couple to a scanner (e.g., bar code, or the like) and receive signals indicative of barcodes scanned by the scanner. In such an example, barcodes can be implemented on racks, posts, brackets, and/or sleds of the data center and such signals can be used by the ID/location component 2044 to determine a location of the robot within the data center and/or identify particular racks, sled spaces, and/or sleds of the data center.

The movement control component 2046 can be configured to send controls signal to the multi-directional wheels 2095 to initiate movement of the robot within a data center. More specifically, the movement control component 2046 can send control signals to motors and/or actuators coupled to the multi-directional wheels 2095. In some examples, the movement control component 2046 can be coupled to the command component 2042 and can determine movements for the robot based on operations determined (or received) by the command components 2042.

The arm control component 2048 be configured to send control signals to the robot arm 2091 to initiate movement of the robot arm. More specifically, the arm control component 2048 can send control signals to motors and/or actuators coupled to the robot arm 2091. In some examples, the arm control component 2048 can be coupled to the command component 2042 and can determine movements for the robot arm 2091 based on operations determined (or received) by the command components 2042.

In some examples, the movement control component 2046 and arm control component 2048 can be coupled to the communications interface 2060 and radio 2061 and can receive indications of movements to make from a human operator. Said differently, in some examples, the robot 2000 can feature both a manual and an autonomous mode. In such a manual mode, a human operator can remotely control the robot while in an autonomous mode, the robot can be controlled, for example, by a pod manager, by a preconfigured maintenance routine, by logic implemented in controller 2040, or the like.

Figure 21:
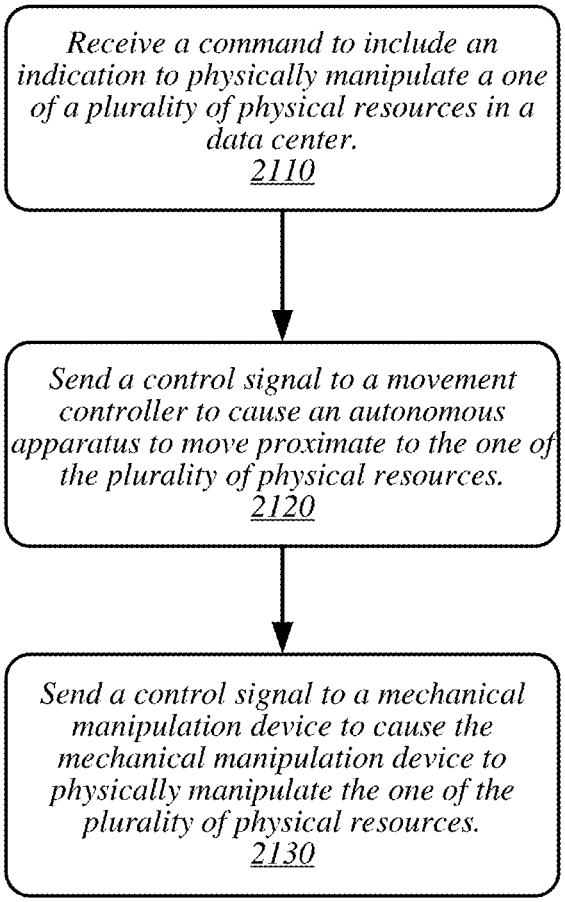
FIG. 21 illustrates a first example logic flow.

FIG. 21 illustrates an example of a logic flow. This figure depicts logic flow 2100. Logic flow 2100 may be representative of some or all of the operations executed by one or more logic, features, or devices described herein, such as, for example, framework 1150A, robot 1990, robot 2000, or the like. More particularly, logic flow 2100 may be implemented by an automated system (e.g., a robot) to manipulate physical resources in a data center as detailed herein. For example, logic flow 2100 can be implemented to manipulated a sled (e.g., install, remove, perform a maintenance operation on, or the like) from a rack in a data center. Although logic flow 2100 can be implemented on any rack according to some embodiments, the rack 1802 depicted in FIG. 1802 is used as a reference to describe logic flow 2100. However, this is done for convenience and clarity of presentation only and not to be limiting.

As depicted in the illustrative example of FIG. 21, logic flow 2100 can begin at block 2110. At block 2110 "receive a command to include an indication to physically manipulate a one of a plurality of physical resources in a data center" a command can be received, the command to include an indication to physically manipulate a one of a plurality of physical resources in a data center. For example, the command component 2042 of robot 2000 can receive a command to include an indication to physically manipulate one of the physical resources of sleds 1804 of rack 1802. For example, command component 2042 can receive a command to include an indication to remove a one of the sleds 1804 and replace the sled with a similar type sled, a different type sled, perform a maintenance operation of the sled and replace the sled, or the like.

Continuing to block 2120 "send a control signal to a movement controller to cause an autonomous apparatus to move proximate to the one of the plurality of physical resources" a control signal to cause an autonomous apparatus (e.g., robot, or the like) to move proximate to the physical resource to be physically manipulated can be sent to a movement controller. For example, command component 2042 can send a control signal to movement control component 2046 to cause movement control component 2046 to actuate multi-directional wheels to cause robot 2000 to move proximate to a physical resource in a data center. For example, movement control component 2046 can actuate multi-directional wheels 2095 to cause robot 2000 to traverse pathways in a data center (e.g., access pathways 311 of FIG. 3, or the like) to move proximate to a physical resource in the data center (e.g. a rack, or the like).

Continuing to block 2130 "send a control signal to a mechanical manipulation device to cause the mechanical manipulation device to physically manipulate the one of the plurality of physical resources" a control signal to cause a mechanical manipulation device to physically manipulate a physical resource of a data center. For example, command component 2042 can send a control signal to arm control component 2048 to cause arm control component 2048 to actuate robotic arm 2091 to cause robotic arm 2091 to physically manipulate a physical resource of a data center. For example, arm control component 2048 can cause robotic arm 2091 to remove a one of the sleds 1804 and replace the sled with a similar type sled, a different type sled, perform a maintenance operation of the sled and replace the sled, or the like. As another example, arm control component 2048 can cause robotic arm 2091 to remove a physical resource from a sled (e.g., SSD drive, or the like) without removing the sled from a rack.

Figure 22:
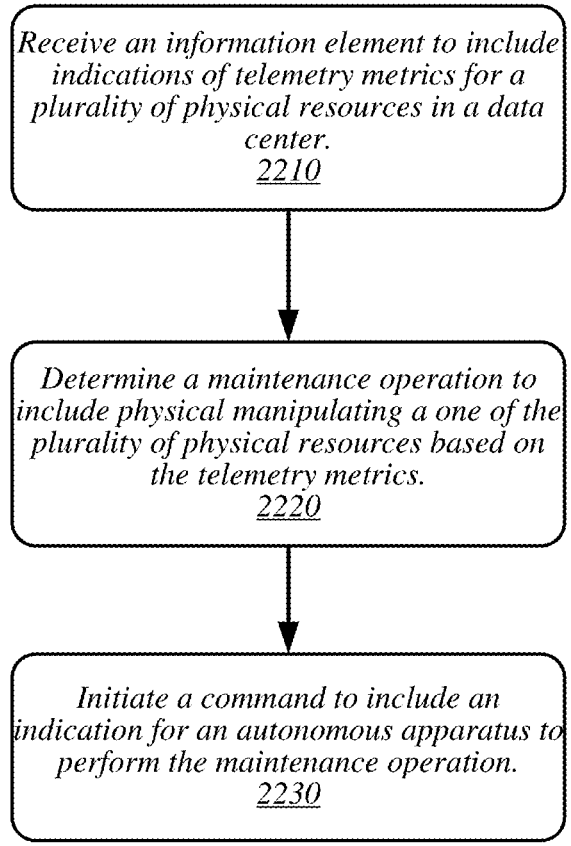
FIG. 22 illustrates a second example logic flow.

FIG. 22 illustrates an example of a logic flow. This figure depicts logic flow 2200. Logic flow 2200 may be representative of some or all of the operations executed by one or more logic, features, or devices described herein, such as, for example, framework 1150A, robot 1900, robot 2000, or the like. More particularly, logic flow 2200 may be implemented by an automated system (e.g., a robot) to manipulate physical resources in a data center as detailed herein. For example, logic flow 2200 can be implemented to determine physical resources in a data center to physically manipulate in an autonomous manner.

As depicted in the illustrative example of FIG. 22, logic flow 2200 can begin at block 2210. At block 2210 "receive an information element to include indications of telemetry metrics for a plurality of physical resources in a data center" an information element to include indications of telemetry metrics for a plurality of physical resources of a data center can be received. For example, the command component

2042 of robot 2000 can receive an information element (e.g., from a pod manager, from racks of a data center, from sleds of a data center, or the like) to include indications of telemetry metrics for physical resources of a data center. For example, command component 2042 can receive indications of telemetry metrics for physical resources of a data center.

Continuing to block 2220 "determine a maintenance operation to include physical manipulating a one of the plurality of physical resources based on the telemetry metrics" a maintenance operation to include physically manipulating a one of the plurality of physical resources of the data center. For example, command component 2042 can determine an operation (e.g., sled removal, sled replacement, sled maintenance, or the like) including physically manipulating a physical resource of a data center. As another example, framework 1150A can determine an operation (e.g., sled removal, sled replacement, sled maintenance, or the like) including physically manipulating a physical resource of a data center.

Continuing to block 2230 "initiate a command to include an indication for an autonomous apparatus to perform the maintenance operation" a command can be initiated including an indication for an autonomous apparatus (e.g., robot 1990, robot 2000, or the like) to perform the maintenance operation. For example, framework 1150A can send a command to robot 2000 to include an indication for robot 2000 to physical manipulate a physical resource of a data center. As another example, can command component 2042 can initiate the maintenance operation autonomously.

Figure 23:
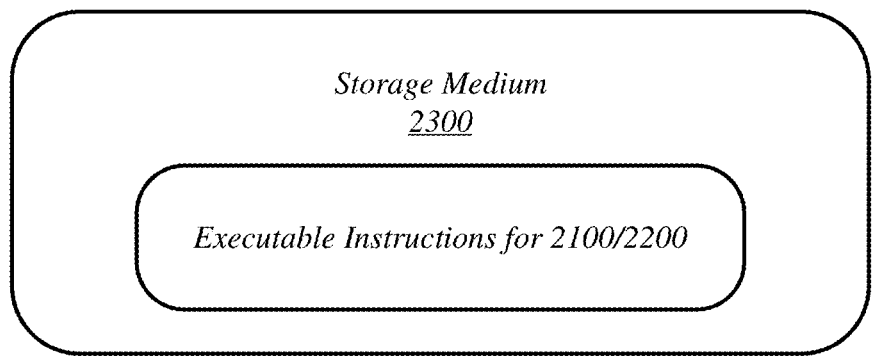
FIG. 23 illustrates an example of a storage medium.

FIG. 23 illustrates an example of a storage medium 2300. Storage medium 2300 may comprise an article of manufacture. In some examples, storage medium 2300 may include any non-transitory computer readable medium or machine readable medium, such as an optical, magnetic or semiconductor storage. Storage medium 2300 may store various types of computer executable instructions, such as instructions to implement logic flow 2100, to implement logic flow 2200, or to implement a logic flow according to some embodiments. Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 24:
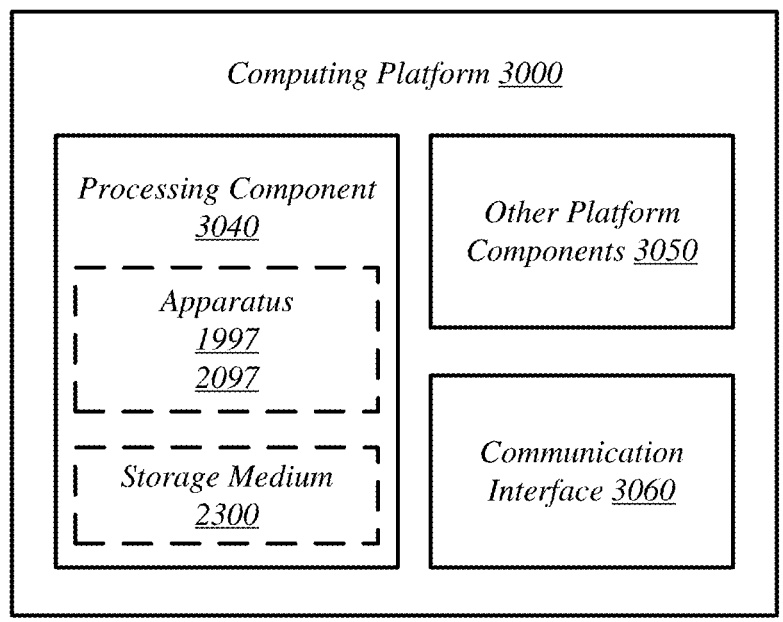
FIG. 24 illustrates an example computing platform.

FIG. 24 illustrates an example computing platform 3000. In some examples, as shown in this figure, computing platform 3000 may include a processing component 3040, other platform components or a communications interface 3060. According to some examples, computing platform 3000 may be implemented in a computing device such as a server in a system such as a data center or server farm that supports a manager or controller for managing configurable computing resources as mentioned above.

According to some examples, processing component 3040 may include hardware or logic for apparatus described herein, such as, for control unit 1997, control unit 2097, or storage medium 2300. Processing component 3040 may include various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, device drivers, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given example.

In some examples, other platform components 3050 may include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory), solid state drives (SSD) and any other type of storage media suitable for storing information.

In some examples, communications interface 3060 may include logic and/or features to support a communication interface. For these examples, communications interface 3060 may include one or more communication interfaces that operate according to various communication protocols or standards to communicate over direct or network communication links. Direct communications may occur via use of communication protocols or standards described in one or more industry standards (including progenies and variants) such as those associated with the PCI Express specification. Network communications may occur via use of communication protocols or standards such those described in one or more Ethernet standards promulgated by the Institute of Electrical and Electronics Engineers (IEEE). For example, one such Ethernet standard may include IEEE 802.3-2012, Carrier sense Multiple access with Collision Detection (CSMA/CD) Access Method and Physical Layer Specifications, Published in December 2012 (hereinafter "IEEE 802.3"). Network communication may also occur according to one or more OpenFlow specifications such as the OpenFlow Hardware Abstraction API Specification. Network communications may also occur according to Infiniband Architecture Specification, Volume 1, Release 1.3, published in March 2015 ("the Infiniband Architecture specification").

Computing platform 3000 may be part of a computing device that may be, for example, a server, a server array or server farm, a web server, a network server, an Internet server, a work station, a mini-computer, a main frame computer, a supercomputer, a network appliance, a web appliance, a distributed computing system, multiprocessor systems, processor-based systems, or combination thereof. Accordingly, functions and/or specific configurations of computing platform 3000 described herein, may be included or omitted in various embodiments of computing platform 3000, as suitably desired.

The components and features of computing platform 3000 may be implemented using any combination of discrete circuitry, ASICs, logic gates and/or single chip architectures. Further, the features of computing platform 3000 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary computing platform 3000 shown in the block diagram of this figure may represent one functionally descriptive example of many potential implementations. Accordingly, division, omission or inclusion of block functions depicted in the accompanying figures does not infer that the hardware components, circuits, software and/or elements for implementing these functions would necessarily be divided, omitted, or included in embodiments.

One or more aspects of at least one example may be implemented by representative instructions stored on at least one machine-readable medium which represents various logic within the processor, which when read by a machine, computing device or system causes the machine, computing device or system to fabricate logic to perform the techniques described herein. Such representations, known as "IP cores" may be stored on a tangible, machine readable medium and supplied to various customers or manufacturing facilities to load into the fabrication machines that actually make the logic or processor.

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some examples may include an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a machine, computing device or system to perform a certain function. The instructions may be implemented using any suitable high-level, low-level, object-oriented, visual, compiled and/or interpreted programming language.

Some examples may be described using the expression "in one example" or "an example" along with their derivatives. These terms mean that a particular feature, structure, or characteristic described in connection with the example is included in at least one example. The appearances of the phrase "in one example" in various places in the specification are not necessarily all referring to the same example.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single example for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

EXAMPLE 1

A data center rack, comprising: a first post and a second post; and a plurality of pairs of sled brackets, a first sled bracket from each of the plurality of pairs of sled brackets coupled to the first post and a second sled bracket from each of the plurality of pairs of sled brackets coupled to the second post, each of the plurality of pairs of sled brackets to receive a sled.

EXAMPLE 2

The data center rack of example 1, the sled to house at least one physical resource.

EXAMPLE 3

The data center rack of example 1, each of the plurality of pairs of sled brackets to define a sled space to receive a sled.

EXAMPLE 4

The data center rack of example 3, comprising a plurality of pairs of sled retainers, a first sled retainer from each of the plurality of pairs of sled retainers coupled to the first sled bracket of a respective one of the plurality of pairs of sled brackets and a second sled retainer from each of the plurality of pairs of sled retainers coupled to the second sled bracket of the respective one of the plurality of pairs of sled brackets, each of the plurality of pairs of sled retainers arranged to couple to a sled inserted into the sled space defined by a one of the plurality of pairs of sled brackets to which the pair of sled retainers is coupled.

EXAMPLE 5

The data center rack of example 4, each of the plurality of pairs of sled retainers arranged to couple to a sled autonomously inserted into the sled space defined by the one of the plurality of pairs of sled brackets to which the pair of sled retainers is coupled.

EXAMPLE 6

The data center rack of example 4, each of the plurality of pairs of sled retainers integrated into a respective one of the plurality of pairs of sled brackets.

EXAMPLE 7

The data center rack of example 4, wherein the sled is insertable into the sled space by a robot.

EXAMPLE 8

The data center rack of example 3, comprising a plurality of multi-purpose connector modules (MPCMs), each of the plurality of MPCMs disposed in a respective one of the plurality of sled spaces.

EXAMPLE 9

The data center rack of example 8, comprising a plurality of MPCM brackets coupled to the first and the second posts, the plurality of MPCM brackets coupled to respective ones of the MPCMs to fix the plurality of MPCMs in an orientation in the sled space.

EXAMPLE 10

The data center rack of example 8, comprising: an interconnect loom disposed within at least one of the first or second posts; and a plurality of optical interconnect cables, each of the plurality of optical interconnect cables coupled to a respective MPCM of the plurality of MPCMs and routed to the interconnect loom.

EXAMPLE 11

The data center rack of example 10, wherein the plurality of optical interconnect cables are at least partially disposed within the interconnect loom.

EXAMPLE 12

The data center rack of example 11, each of the plurality of interconnect cables routed to the interconnect loom via a plurality of sled space cabling access ports defined in the at least one of the first or second posts.

EXAMPLE 13

The data center rack of example 11, comprising a plurality of power modules, each of the plurality of power modules configured to supply power to a sled in a respective sled space.

EXAMPLE 14

The data center rack of example 13, each of the plurality of power modules coupled to a respective first one of the plurality of pairs of sled brackets.

EXAMPLE 15

The data center rack of example 14, comprising a plurality of electrical power cables, each of the plurality of electrical power cables coupled to a respective MPCM of the plurality of MPCMs and a respective power module.

EXAMPLE 16

The data center rack of example 15, each of the plurality of power modules configured to source alternating current (AC) power and provide direct current (DC) power.

EXAMPLE 17

The data center rack of example 15, each of the plurality of MPCMs comprising a receptacle arranged to couple to a sled side MPCM.

EXAMPLE 18

The data center rack of example 17, each of the plurality of MPCMs comprising: an optical connector arranged to couple to an optical connector of the sled side MPCM to couple the sled side MPCM to an optical fabric; and a power connector arranged to couple to a power connector of the sled side MPCM to couple the sled side MPCM to a one of the plurality of power modules.

EXAMPLE 19

The data center rack of any one of examples 1 to 18, comprising: an expansion post disposed between the first and the second post; and a plurality of expansion sled brackets coupled to the expansion post, each of the plurality of expansion sled brackets corresponding to a one of the plurality of pairs of sled brackets, each of the plurality of expansion sled brackets and corresponding one of the plurality of pairs of sled brackets defining an expansion sled space to receive an expansion sled housing at least one physical resource.

EXAMPLE 20

The data center rack of any one of examples 3 to 18, comprising a sled inserted into a one of the plurality of sled spaces.

EXAMPLE 21

The data center rack of example 20, the sled to house at least one physical resource.

EXAMPLE 22

The data center rack of any one of examples 9 to 18, each of the plurality of MPCMs arranged to couple a sled inserted into a sled space to an optical fabric of a data center.

EXAMPLE 23

The data center rack of example 5, each of the plurality of pairs of sled retainers comprising an alignment track, the alignment track arranged to mechanically couple to the rack mounting feature of the sled to facilitate autonomously inserting the sled into the sled space defined by the one of the plurality of pairs of sled brackets to which the pair of sled retainers is coupled.

EXAMPLE 24

The data center rack of example 23, the alignment tracks arranged to mechanically decouple to the rack mounting feature of the sled to facilitate autonomously removing the sled from the sled space defined by the one of the plurality of pairs of sled brackets to which the pair of sled retainers is coupled.

EXAMPLE 25

The data center rack of any one of examples 1 to 18, wherein the rack does not comprise more posts than the first and the second post.

EXAMPLE 26

The data center rack of any one of examples 1 to 18, wherein the first and the second posts are disposed at rear corners of the rack to define a rear plane of the rack.

EXAMPLE 27

The data center rack of example 26, wherein each of the plurality of pairs of sled brackets are coupled to the first and the second posts to define side planes of the rack.

EXAMPLE 28

The data center rack of example 27, wherein the side planes are open air.

EXAMPLE 29

The data center rack of example 28, wherein the rack does not comprise a housing covering the side planes.

EXAMPLE 30

The data center rack of any one of examples 3 to 18, wherein the sled space is greater than a conventional rack unit.

EXAMPLE 31

The data center rack of any one of examples 3 to 18, wherein the sled pace is not an integer multiple of a conventional rack unit.

EXAMPLE 32

The data center rack of any one of examples 3 to 18, wherein the sled space is not an integer multiple of 1.75 inches.

EXAMPLE 33

A system comprising: a sled for a data center, the sled comprising: a rack mounting feature; and at least one physical resource; and a rack of the data center, the rack comprising: a first post and a second post; and a plurality of pairs of sled brackets, a first sled bracket from each of the plurality of pairs of sled brackets coupled to the first post and a second sled bracket from each of the plurality of pairs of sled brackets coupled to the second post, each of the plurality of pairs of sled brackets to define a sled space to receive a sled.

EXAMPLE 34

The system of example 33, the rack comprising a plurality of pairs of sled retainers, a first sled retainer from each of the plurality of pairs of sled retainers coupled to the first sled bracket of a respective one of the plurality of pairs of sled brackets and a second sled retainer from each of the plurality of pairs of sled retainers coupled to the second sled bracket of the respective one of the plurality of pairs of sled brackets, each of the plurality of pairs of sled retainers arranged to couple to the sled.

EXAMPLE 35

The system of example 34, each of the plurality of pairs of sled retainers arranged to couple to the sled autonomously.

EXAMPLE 36

The system of example 34, each of the plurality of pairs of sled retainers integrated into a respective one of the plurality of pairs of sled brackets.

EXAMPLE 37

The system of example 34, wherein the sled is insertable into the sled space by a robot.

EXAMPLE 38

The system of example 33, the rack comprising a plurality of multi-purpose connector modules (MPCMs), each of the plurality of MPCMs disposed in a respective one of the plurality of sled spaces.

EXAMPLE 39

The system of example 38, the rack comprising a plurality of MPCM brackets coupled to the first and the second posts, the plurality of MPCM brackets coupled to respective ones of the MPCMs to fix the plurality of MPCMs in an orientation in the sled space.

EXAMPLE 40

The system of example 38, the rack comprising: an interconnect loom disposed within at least one of the first or second posts; and a plurality of optical interconnect cables, each of the plurality of optical interconnect cables coupled to a respective MPCM of the plurality of MPCMs and routed to the interconnect loom.

EXAMPLE 41

The system of example 40, each of the plurality of interconnect cables routed to the interconnect loom via a plurality of sled space cabling access ports defined in the at least one of the first or second posts.

EXAMPLE 42

The system of example 40, comprising a plurality of power modules, each of the plurality of power modules configured to supply power to a sled in a respective sled space.

EXAMPLE 43

The system of example 42, each of the plurality of power modules coupled to a respective first one of the plurality of pairs of sled brackets.

EXAMPLE 44

The system of example 43, comprising a plurality of electrical power cables, each of the plurality of electrical power cables coupled to a respective MPCM of the plurality of MPCMs and a respective power module.

EXAMPLE 45

The system of example 44, each of the plurality of power modules configured to source alternating current (AC) power and provide direct current (DC) power.

EXAMPLE 46

The system of example 45, the sled comprising a sled side MPCM arranged to couple to the plurality of rack side MPCMs.

EXAMPLE 47

The system of example 46, each of the plurality of MPCMs comprising a receptacle arranged to couple to the sled side MPCM.

EXAMPLE 48

The system of example 47, each of the plurality of MPCMs comprising: an optical connector arranged to couple to an optical connector of the sled side MPCM to couple the sled side MPCM to an optical fabric; and a power connector arranged to couple to a power connector of the sled side MPCM to couple the sled side MPCM to a one of the plurality of power modules.

EXAMPLE 49

The system of any one of examples 33 to 48, comprising: an expansion post disposed between the first and the second post; and a plurality of expansion sled brackets coupled to the expansion post, each of the plurality of expansion sled brackets corresponding to a one of the plurality of pairs of sled brackets, each of the plurality of expansion sled brackets and corresponding one of the plurality of pairs of sled brackets defining an expansion sled space to receive an expansion sled housing at least one physical resource.

EXAMPLE 50

The system of example 49, comprising an expansion sled inserted into one of the expansion sled spaces.

EXAMPLE 51

The system of example 50, the expansion sled comprising at least one supplemental physical resource.

EXAMPLE 52

The system of example 51, comprising an optical interconnect to couple the at least one physical resource to the at least one supplemental physical resource.

EXAMPLE 53

The system of example 34, the sled comprising at least one rack mounting feature arranged to couple to the rack.

EXAMPLE 54

The system of example 53, each of the plurality of pairs of sled retainers comprising an alignment track, the alignment track arranged to mechanically couple to the rack mounting feature of the sled to facilitate autonomously inserting the sled into the sled space defined by the one of the plurality of pairs of sled brackets to which the pair of sled retainers is coupled.

EXAMPLE 55

The system of example 54, the alignment tracks arranged to mechanically decouple to the rack mounting feature of the sled to facilitate autonomously removing the sled from the sled space defined by the one of the plurality of pairs of sled brackets to which the pair of sled retainers is coupled.

EXAMPLE 56

The system of example 33, comprising an optical fabric interconnect to couple the at least one physical resource of the sled to an optical fabric.

EXAMPLE 57

The system of example 40, wherein the plurality of optical interconnect cables are at least partially disposed within the interconnect loom.

EXAMPLE 58

The system of any one of examples 33 to 48, wherein the rack does not comprise more posts than the first and the second post.

EXAMPLE 59

The system of any one of examples 33 to 48, wherein the first and the second posts are disposed at rear corners of the rack to define a rear plane of the rack.

EXAMPLE 60

The system of example 59, wherein each of the plurality of pairs of sled brackets are coupled to the first and the second posts to define side planes of the rack.

EXAMPLE 61

The system of example 60, wherein the side planes are open air.

EXAMPLE 62

The system of example 61, wherein the rack does not comprise a housing covering the side planes.

EXAMPLE 63

The system of any one of examples 33 to 48, wherein the sled space is greater than a conventional rack unit.

EXAMPLE 64

The system of any one of examples 33 to 48, wherein the sled pace is not an integer multiple of a conventional rack unit.

EXAMPLE 65

The system of any one of examples 33 to 48, wherein the sled space is not an integer multiple of 1.75 inches.

EXAMPLE 68

A method comprising: sending a movement control signal to a robot, the movement control signal to include an indication for the robot to move proximate to the one of a plurality of physical resources housed in a sled in a data center; and sending a manipulation control signal to the robot, the manipulation control signal to include an indication for the robot to physically manipulate the one of the plurality of physical resources.

EXAMPLE 69

The method of example 68, comprising receiving a command including an indication to physically manipulate the one of a plurality of physical resources in a data center;

EXAMPLE 70

The method of example 68, comprising: receiving the command at the robot; and generating, by a controller of the robot the movement control signal and the manipulation control signal.

EXAMPLE 71

The method of example 70, the physical resource housed on a sled in a rack of the data center, the command comprising an indication to remove the sled from the rack.

EXAMPLE 72

The method of example 71, the command comprising an indication to replace the removed sled with a sled housing a physical resource of the same type as the one of the plurality of physical resources.

EXAMPLE 73

The method of example 72, comprising removing, by a robot, the sled from a sled space of the rack.

EXAMPLE 74

The method of example 73, comprising inserting, by a robot, a replacement sled into the sled space of the rack.

EXAMPLE 75

The method of any one of examples 59 to 72, the rack comprising: a first post and a second post; and a plurality of pairs of sled brackets, a first sled bracket from each of the plurality of pairs of sled brackets coupled to the first post and a second sled bracket from each of the plurality of pairs of sled brackets coupled to the second post, each of the plurality of pairs of sled brackets to define a sled space to receive a sled.

EXAMPLE 76

The method of example 75, the sled to house at least one physical resource.

EXAMPLE 77

The method of example 75, the rack comprising a plurality of pairs of sled retainers, a first sled retainer from each of the plurality of pairs of sled retainers coupled to the first sled bracket of a respective one of the plurality of pairs of sled brackets and a second sled retainer from each of the plurality of pairs of sled retainers coupled to the second sled bracket of the respective one of the plurality of pairs of sled brackets, each of the plurality of pairs of sled retainers arranged to couple to a sled inserted into the sled space defined by a one of the plurality of pairs of sled brackets to which the pair of sled retainers is coupled.

EXAMPLE 78

The method of example 77, each of the plurality of pairs of sled retainers arranged to couple to a sled autonomously inserted into the sled space defined by the one of the plurality of pairs of sled brackets to which the pair of sled retainers is coupled.

EXAMPLE 79

The method of example 77, each of the plurality of pairs of sled retainers integrated into a respective one of the plurality of pairs of sled brackets.

EXAMPLE 80

The method of example 79, the rack comprising a plurality of multi-purpose connector modules (MPCMs), each of the plurality of MPCMs disposed in a respective one of the plurality of sled spaces.

EXAMPLE 81

The method of example 80, the rack comprising a plurality of MPCM brackets coupled to the first and the second posts, the plurality of MPCM brackets coupled to respective ones of the MPCMs to fix the plurality of MPCMs in an orientation in the sled space.

EXAMPLE 82

The method of example 80, the rack comprising: an interconnect loom disposed within at least one of the first or second posts; and a plurality of optical interconnect cables, each of the plurality of optical interconnect cables coupled to a respective MPCM of the plurality of MPCMs and routed to the interconnect loom.

EXAMPLE 83

The method of example 82, each of the plurality of interconnect cables routed to the interconnect loom via a plurality of sled space cabling access ports defined in the at least one of the first or second posts.

EXAMPLE 84

The method of example 82, the rack comprising a plurality of power modules, each of the plurality of power modules configured to supply power to a sled in a respective sled space.

EXAMPLE 85

The method of example 84, each of the plurality of power modules coupled to a respective first one of the plurality of pairs of sled brackets.

EXAMPLE 86

The method of example 85, the rack comprising a plurality of electrical power cables, each of the plurality of electrical power cables coupled to a respective MPCM of the plurality of MPCMs and a respective power module.

EXAMPLE 87

The method of example 86, each of the plurality of power modules configured to source alternating current (AC) power and provide direct current (DC) power.

EXAMPLE 88

The method of example 87, each of the plurality of MPCMs comprising a receptacle arranged to couple to a sled side MPCM.

EXAMPLE 89

The method of example 88, each of the plurality of MPCMs comprising: an optical connector arranged to couple to an optical connector of the sled side MPCM to couple the sled side MPCM to an optical fabric; and a power connector arranged to couple to a power connector of the sled side MPCM to couple the sled side MPCM to a one of the plurality of power modules.

EXAMPLE 90

The method of any one of examples 68 to 89, the rack comprising: an expansion post disposed between the first and the second post; and a plurality of expansion sled brackets coupled to the expansion post, each of the plurality of expansion sled brackets corresponding to a one of the plurality of pairs of sled brackets, each of the plurality of expansion sled brackets and corresponding one of the plurality of pairs of sled brackets defining an expansion sled space to receive an expansion sled housing at least one physical resource.

EXAMPLE 91

The method of any one of examples 68 to 89, wherein the rack does not comprise more posts than the first and the second post.

EXAMPLE 92

The method of any one of examples 68 to 89, wherein the first and the second posts are disposed at rear corners of the rack to define a rear plane of the rack.

EXAMPLE 93

The method of example 92, wherein each of the plurality of pairs of sled brackets are coupled to the first and the second posts to define side planes of the rack.

EXAMPLE 94

The method of example 93, wherein the side planes are open air.

EXAMPLE 95

The method of example 94, wherein the rack does not comprise a housing covering the side planes.

EXAMPLE 96

The method of any one of examples 68 to 89, wherein the sled space is greater than a conventional rack unit.

EXAMPLE 97

The method of any one of examples 68 to 89, wherein the sled pace is not an integer multiple of a conventional rack unit.

EXAMPLE 98

The method of any one of examples 68 to 89, wherein the sled space is not an integer multiple of 1.75 inches.

EXAMPLE 99

A method comprising: receiving an information element to include indications of telemetry metrics for a plurality of physical resources in a data center; determining a maintenance operation to include physically manipulating a one of the plurality of physical resources based on the telemetry metrics; and initiating a command to include an indication for an autonomous apparatus to perform the maintenance operation.

EXAMPLE 100

The method of example 99, comprising: receiving, at the autonomous apparatus, the information element to include the indications of telemetry metrics for the plurality of physical resources in the data center; and determining, by the autonomous apparatus, the maintenance operation to include physically manipulating the one of the plurality of physical resources based on the telemetry metrics.

EXAMPLE 101

The method of example 70, the physical resource housed on a sled in a rack of the data center, the command comprising an indication to remove the sled from the rack.

EXAMPLE 102

The method of example 71, comprising removing, by the autonomous apparatus, the sled from a sled space of the rack.

EXAMPLE 103

The method of example 72, comprising inserting, by the autonomous apparatus, a replacement sled into the sled space of the rack.

EXAMPLE 104

At least one machine readable medium comprising a plurality of instructions that in response to being executed by an autonomous apparatus of a data center, cause the autonomous apparatus to: receive a command to include an indication to physically manipulate a one of a plurality of physical resources in a data center; send a movement control signal to a robot, the movement control signal to include an indication for the robot to move proximate to the one of the plurality of physical resources; and send a manipulation control signal to the robot, the manipulation control signal to include an indication for the robot to physically manipulate the one of the plurality of physical resources.

EXAMPLE 105

The at least one machine readable medium of example 104, comprising instructions that cause the autonomous apparatus to: receive the command at the robot; and generate, by a controller of the robot the movement control signal and the manipulation control signal.

EXAMPLE 106

The at least one machine readable medium of example 105, the physical resource housed on a sled in a rack of the data center, the command comprising an indication to remove the sled from the rack.

EXAMPLE 107

The at least one machine readable medium of example 106, the command comprising an indication to replace the removed sled with a sled housing a physical resource of the same type as the one of the plurality of physical resources.

EXAMPLE 108

The at least one machine readable medium of example 107, comprising instructions that cause the autonomous apparatus to remove, by a robot, the sled from a sled space of the rack.

EXAMPLE 109

The at least one machine readable medium of example 108, comprising instructions that cause the autonomous apparatus to insert, by a robot, a replacement sled into the sled space of the rack.

EXAMPLE 110

At least one machine readable medium comprising a plurality of instructions that in response to being executed by an autonomous apparatus of a data center, cause the autonomous apparatus to: receive an information element to include indications of telemetry metrics for a plurality of physical resources in a data center; determine a maintenance operation to include physically manipulating a one of the plurality of physical resources based on the telemetry metrics; and initiate a command to include an indication for an autonomous apparatus to perform the maintenance operation.

EXAMPLE 111

The at least one machine readable medium of example 110, comprising instructions that cause the autonomous apparatus to: receive, at the autonomous apparatus, the information element to include the indications of telemetry metrics for the plurality of physical resources in the data center; and determine, by the autonomous apparatus, the maintenance operation to include physically manipulating the one of the plurality of physical resources based on the telemetry metrics.

EXAMPLE 112

The at least one machine readable medium of example 111, the physical resource housed on a sled in a rack of the data center, the command comprising an indication to remove the sled from the rack.

EXAMPLE 113

The at least one machine readable medium of example 112, comprising instructions that cause the autonomous apparatus to remove the sled from a sled space of the rack.

EXAMPLE 114

The at least one machine readable medium of example 113, comprising instructions that cause the autonomous apparatus to insert a replacement sled into the sled space of the rack.

EXAMPLE 115

An apparatus for a rack of a data center, comprising: a sled to house at least one physical resource, the sled comprising: a multi-purpose connector module (MPCM) to couple to a MPCP of a rack of a data center to communicatively couple the at least one physical resource to an optical fabric; at least one rack mounting feature to mechanically couple to a of pairs of sled brackets of the rack of the data center.

EXAMPLE 116

The apparatus of example 115, the at least one physical resource a physical compute resource, a physical storage resource, a physical accelerator resource, or a physical memory resource.

EXAMPLE 117

The apparatus of example 115, the MPCM comprising: an optical connector arranged to couple to an optical connector of the MPCMs of the rack to couple the MPCM to the optical fabric; and a power connector arranged to couple to a power connector of the MPCMs of the rack to couple the MPCM to a power module of the rack.

EXAMPLE 118

A system comprising: a sled for a data center, the sled comprising: a plurality of physical compute resources, the plurality of physical compute resources to generate an amount of thermal energy during operation; and a rack of the data center, the rack comprising: a first post and a second post to define a rear plane of the rack; a plurality of pairs of sled brackets, a first sled bracket from each of the plurality of pairs of sled brackets coupled to the first post and a second sled bracket from each of the plurality of pairs of sled brackets coupled to the second post, each of the plurality of pairs of sled brackets to define side planes of the rack, the side planes of the rack not comprising a housing; and a plurality of fans disposed proximate to the rear plane of the rack, the plurality of fans to move air across the plurality of physical compute resources to cool the physical compute resources.

EXAMPLE 119

The system of example 118, wherein each of the plurality of physical compute resources are disposed on the sled and proximate to the rear plane of the rack.

EXAMPLE 120

The system of example 119, wherein the plurality of physical compute resources thermally dissipates between 200 and 300 Watts.

EXAMPLE 121

The system of example 119, wherein each of the plurality of physical compute resources thermally dissipate between 200 and 300 Watts.

EXAMPLE 121

The system of any one of examples 118 to 121, wherein the sled pace is not an integer multiple of a conventional rack unit.

EXAMPLE 122

The system of any one of examples 118 to 121, wherein the sled is less than 18 inches deep.

EXAMPLE 123

The system of any one of examples 118 to 121, wherein the sled is greater than 5 inches high.

EXAMPLE 124

The system of any one of examples 118 to 121, wherein the sled is greater than 20 inches wide.

EXAMPLE 125

The system of any one of examples 118 to 121, wherein the sled is 18 inches wide, 10 inches deep, and 8 inches high.

The invention claimed is:
1. A data center rack, comprising:
a first post and a second post;
a plurality of pairs of sled brackets, a first sled bracket from each of the plurality of pairs of sled brackets coupled to the first post and a second sled bracket from each of the plurality of pairs of sled brackets coupled to the second post, each of the plurality of pairs of sled brackets to receive a sled; and
a pair of sled retainers coupled to a corresponding pair of sled brackets, wherein the pair of sled retainers defines a track that is wider at a frontal portion of the track and narrower at a rear portion of the track to guide an inserted sled to a predefined position within a sled space defined by the corresponding pair of sled brackets to connect the inserted sled to a multi-purpose connector module (MPCM) mounted to the rack, wherein the MPCM is to provide, to the inserted sled, access to power sourced by a power module and optical signaling connectivity to a dual-mode optical switching infrastructure.

2. The data center rack of claim 1, comprising a plurality of multi-purpose connector modules (MPCMs), each of the plurality of MPCMs disposed in a respective one of the plurality of sled spaces.

3. The data center rack of claim 2, wherein each MPCM is configured to blindly mate with a sled inserted into the sled space.

4. The data center rack of claim 2, comprising a plurality of MPCM brackets coupled to the first and the second posts, the plurality of MPCM brackets coupled to respective ones of the MPCMs to fix the plurality of MPCMs in an orientation in the sled space.

5. The data center rack of claim 2, comprising:
an interconnect loom disposed within at least one of the first or second posts; and
a plurality of optical interconnect cables, each of the plurality of optical interconnect cables coupled to a respective MPCM of the plurality of MPCMs and routed to the interconnect loom.

6. The data center rack of claim 5, each of the plurality of interconnect cables routed to the interconnect loom via a plurality of sled space cabling access ports defined in the at least one of the first or second posts.

7. The data center rack of claim 5, comprising a plurality of power modules, each of the plurality of power modules configured to supply power to a sled in a respective sled space.

8. The data center rack of claim 7, each of the plurality of MPCMs comprising:
an optical connector arranged to couple to an optical connector of the sled side MPCM to couple the sled side MPCM to an optical fabric; and
a power connector arranged to couple to a power connector of the sled side MPCM to couple the sled side MPCM to a one of the plurality of power modules.

9. The data center rack of claim 1, comprising:
an expansion post disposed between the first and the second post; and
a plurality of expansion sled brackets coupled to the expansion post, each of the plurality of expansion sled brackets corresponding to a one of the plurality of pairs of sled brackets, each of the plurality of expansion sled brackets and corresponding one of the plurality of pairs of sled brackets defining an expansion sled space to receive an expansion sled housing at least one physical resource.

10. The data center rack of claim 1, wherein each sled retainer comprises a lip located at an entrance to the track.

11. A system, comprising:
a sled for a data center, the sled comprising:
a rack mounting feature; and
at least one physical resource; and
a rack of the data center, the rack comprising:
a first post and a second post;
a plurality of pairs of sled brackets, a first sled bracket from each of the plurality of pairs of sled brackets coupled to the first post and a second sled bracket from each of the plurality of pairs of sled brackets coupled to the second post, each of the plurality of pairs of sled brackets to define a sled space to receive a sled; and
a pair of sled retainers coupled to a corresponding pair of sled brackets, wherein the pair of sled retainers defines a track that is wider at a frontal portion of the track and narrower at a rear portion of the track to guide an inserted sled to a predefined position within a sled space defined by the corresponding pair of sled brackets to connect the inserted sled to a multi-purpose connector module (MPCM) mounted to the rack, wherein the MPCM is to provide, to the inserted sled, access to power sourced by a power module and optical signaling connectivity to a dual-mode optical switching infrastructure.

12. The system of claim 11, the rack comprising a plurality of multi-purpose connector modules (MPCMs), each of the plurality of MPCMs disposed in a respective one of the plurality of sled spaces.

13. The system of claim 12, the rack comprising:
an interconnect loom disposed within at least one of the first or second posts; and
a plurality of optical interconnect cables, each of the plurality of optical interconnect cables coupled to a respective MPCM of the plurality of MPCMs and routed to the interconnect loom.

14. The system of claim 13, comprising a plurality of power modules, each of the plurality of power modules configured to supply power to a sled in a respective sled space.

15. The system of claim 14, comprising a plurality of electrical power cables, each of the plurality of electrical power cables coupled to a respective MPCM of the plurality of MPCMs and a respective power module.

16. The system of claim 15, each of the plurality of power modules configured to source alternating current (AC) power and provide direct current (DC) power.

17. The system of claim 16, the sled comprising a sled side MPCM arranged to couple to the plurality of rack side MPCMs.

18. The system of claim 17, each of the plurality of MPCMs comprising:
an optical connector arranged to couple to an optical connector of the sled side MPCM to couple the sled side MPCM to an optical fabric; and
a power connector arranged to couple to a power connector of the sled side MPCM to couple the sled side MPCM to a one of the plurality of power modules.

19. The system of claim 11, comprising:
an expansion post disposed between the first and the second post; and
a plurality of expansion sled brackets coupled to the expansion post, each of the plurality of expansion sled brackets corresponding to a one of the plurality of pairs of sled brackets, each of the plurality of expansion sled brackets and corresponding one of the plurality of pairs of sled brackets defining an expansion sled space to receive an expansion sled housing at least one physical resource.

20. The system of claim 19, comprising an expansion sled inserted into one of the expansion sled spaces, the expansion sled comprising at least one supplemental physical resource, the rack comprising an optical interconnect to couple the at least one physical resource to the at least one supplemental physical resource.

21. A system comprising:
a sled for a data center, the sled comprising a plurality of physical compute resources, the plurality of physical compute resources to generate an amount of thermal energy during operation; and
a rack of the data center, the rack comprising:
a first post and a second post to define a rear plane of the rack;

a plurality of pairs of sled brackets, a first sled bracket from each of the plurality of pairs of sled brackets coupled to the first post and a second sled bracket from each of the plurality of pairs of sled brackets coupled to the second post, each of the plurality of pairs of sled brackets to define side planes of the rack, the side planes of the rack not comprising a housing;

a pair of sled retainers coupled to a corresponding pair of sled brackets, wherein the pair of sled retainers defines a track that is wider at a frontal portion of the track and narrower at a rear portion of the track to guide an inserted sled to a predefined position within a sled space defined by the corresponding pair of sled brackets to connect the inserted sled to a multi-purpose connector module (MPCM) mounted to the rack, wherein the MPCM is to provide, to the inserted sled, access to power sourced by a power module and optical signaling connectivity to a dual-mode optical switching infrastructure; and a plurality of fans disposed proximate to the rear plane of the rack, the plurality of fans to move air across the plurality of physical compute resources to cool the physical compute resources.

22. The system of claim 21, wherein each of the plurality of physical compute resources are disposed on the sled and proximate to the rear plane of the rack.

23. The system of claim 22, wherein the plurality of physical compute resources thermally dissipates between 200 and 300 Watts or wherein each of the plurality of physical compute resources thermally dissipate between 200 and 300 Watts.

24. The system of claim 21, wherein the sled is less than 18 inches deep, greater than 5 inches high and greater than 20 inches wide.

* * * * *